United States Patent
Couillard et al.

(10) Patent No.: US 6,517,650 B2
(45) Date of Patent: Feb. 11, 2003

(54) ULTRASONIC BONDING APPARATUS AND METHODS

(75) Inventors: Jack Lee Couillard, Menasha, WI (US); Kent William Abel, Black Creek, WI (US); Joseph Daniel Coenen, Kaukauna, WI (US); Michael Lee Lohoff, Oshkosh, WI (US); Robin Kurt Nason, Oshkosh, WI (US); Dan James Sorensen, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 113 days.

(21) Appl. No.: 09/727,129

(22) Filed: Nov. 30, 2000

(65) Prior Publication Data

US 2002/0062902 A1 May 30, 2002

(51) Int. Cl.[7] .............................. B29C 65/08
(52) U.S. Cl. ................. 156/73.1; 156/290; 156/308.4; 156/553; 156/555; 156/580.2; 156/582
(58) Field of Search ............... 156/73.1, 290, 156/308.2, 308.4, 324, 553, 555, 580.1, 580.2, 582

(56) References Cited

U.S. PATENT DOCUMENTS

| | | | | |
|---|---|---|---|---|
| 5,733,411 A | * | 3/1998 | Bett | 156/580.2 |
| 5,817,199 A | * | 10/1998 | Brennecke et al. | 156/73.1 |
| 6,149,755 A | * | 11/2000 | McNichols et al. | 156/264 |
| 6,165,298 A | * | 12/2000 | Samida et al. | 156/73.1 |
| 6,287,403 B1 | * | 9/2001 | Couillard et al. | 156/73.1 |

* cited by examiner

Primary Examiner—James Sells
(74) Attorney, Agent, or Firm—Wilhelm Law Service; Thomas D. Wilhelm

(57) ABSTRACT

This invention pertains to apparatus and methods for intermittently creating ultrasonic bonds in sequentially advancing work piece segments, in a nip. The work piece segments are up to about 0.25 inch thick. The apparatus comprises a frame, anvil support apparatus supporting an anvil, and horn support apparatus supporting an ultrasonic horn. The ultrasonic horn and anvil are collectively mounted and configured such that the ultrasonic horn and anvil can be brought together to define the nip. The frame, anvil support apparatus, and horn support apparatus collectively are sufficiently rigid that the horn and anvil can be brought together with interference levels of about 0.000 to about 0.008 inch at a raised bonding portion in combination with defining sufficient nip pressure to develop ultrasonic bonds in work piece segments passing through the nip. The method comprehends bringing a back-up roll, mounted above the ultrasonic horn, into engagement with the ultrasonic horn, to directly support the horn. First and second support rolls can be used to releasably support opposing sides of the outer surface of the ultrasonic horn, preferably below the axis of the horn, whereby the support rolls can be used to lift the horn into engagement with the back-up roll.

54 Claims, 7 Drawing Sheets

ULTRASONIC BONDING APPARATUS AND METHODS

BACKGROUND

The present invention relates to apparatus and methods for effecting ultrasonic bonding on at least one continuously moving web or work piece attached to a continuously moving web using ultrasonic bonding apparatus. The invention more particularly concerns apparatus and methods for ultrasonically bonding at least one continuously moving web using a rotary ultrasonic horn.

It is known to bond at least one continuously moving substrate web by constrictively passing the web between a rotating ultrasonic horn and a rotating anvil roll. Typically, the anvil roll includes one or more arrays of raised projections configured to bond the web in a predetermined bond pattern. The rotary ultrasonic horn is capable of expressing ultrasonic energy at a bonding surface to ultrasonically bond the web as the web constrictively travels between the rotary ultrasonic horn and the anvil roll. Representative examples of rotary ultrasonic horns which have been used to bond at least one web are described in U.S. Pat. No. 5,096,532 to Neuwirth et al issued Mar. 17, 1992; and U.S. Pat. No. 5,110,403 to Ehlert issued May 5, 1992.

The consistency and quality of the bond when using such rotary bonding techniques is dependent on the consistency of the force exerted on the web by the combination of the anvil roll and the bonding roll; the time during which the web is being pressed in the constrictive nip which is dependent on the operating speed; and the types of materials being bonded. The consistency and quality of the bonds are also dependent on the frequency and amplitude of the vibrations of the ultrasonic horn, and the percent bond area which is the area of the pins (projections) in the bond region divided by the surface area of the bond region.

Conventional methods for rotary bonding include a rotating ultrasonic horn which is mounted in a cantilevered configuration such that the horn is not supported about the surface of the bonding roll. However, such conventional methods have not always been sufficiently satisfactory.

The inventors herein have discovered that, while a variety of factors can be adjusted and controlled in defining a more uniform bonding pattern, stiffness/rigidity of the entirety of the bonding apparatus is a critical factor in achieving desired bond uniformity.

Use of a cantilevered bonding roll has inherent limitations which adversely affect the bond quality and which in this invention can be at least partially corrected by replacing the cantilever configuration with an in-line or balanced force application which avoids application of forces through cantilevered configurations. In cantilevered configurations, it has been very difficult to maintain the desired degree of consistency and stability of nip force between the bonding roll and the anvil roll. As a result, in many conventional methods for rotary bonding, bond quality and/or consistency has been undesirably variable both along the length of the bond region and across the width of the bond region. In addition, processes using cantilevered rotary ultrasonic horns have not been as robust as desired for a manufacturing environment.

Consistency and quality of bonds when using conventional rotary ultrasonic bonding methods and apparatus has been particularly variable where the desired bond pattern is intermittent because the nip pressures inherently change in concert with the intermittent nature of the bonding operation.

When using conventional methods for rotary bonding in such configuration, the bond quality has typically been less than satisfactory along the length of the bond pattern. Such inconsistency in the bond pattern has been due, at least in part, to inconsistent levels of force being effectively applied along the length of respective intermittent bond regions of the bond pattern. Typical of such inconsistency is excessive nip loading at the leading edge of the bond region, and insufficient nip loading behind the leading edge of the respective element as the bonding apparatus flexes or deflects in combination with development of the respective bonding region at the nip. Both the excessive nip loading and the insufficient nip loading have resulted in poor bond quality and poor bond consistency.

Under excessive loading, so much energy may be applied to the materials being bonded as to burn through or otherwise excessively soften the materials being bonded, as well as to apply excessive pressure to the softened materials, whereby bonds so formed may be weak, and/or may be uncomfortably harsh to the touch of a wearer's skin. In the alternative, excessive loading can physically damage, as by tearing, the material being bonded. Additionally, excessive loading can increase wear and thus damage the ultrasonic horn. Finally, ultrasonic horns are generally driven by piezo-electric crystals that convert electrical energy at high frequency into mechanical vibrations. When an excessive impulse load is applied to the horn, the process works in reverse and the resulting electrical spike can overload and shut down the electrical frequency generator.

Generating ultrasonic bonds depends on the combination of frequency and amplitude of the vibrations, the amount of pressure applied, and the time during which pressure is applied. Under conditions of insufficient loading at the nip, too little pressure is applied to the materials to be softened thereby, whereby the amount of energy transferred to the elements to be bonded together is insufficient to develop sufficiently strong bonds.

Conventional methods for rotary bonding have used different approaches to diminish the variations in consistency of the interference. For example, the bonding roll, anvil roll, and support frames have been precisely machined to minimize runout in the bonding system.

As used herein, the term "runout" expresses changes in the radius of the anvil roll and/or the rotary ultrasonic horn about the circumference of the respective rotary element.

The above-mentioned difficulties of maintaining desired bond quality and consistency along both the length and width of the web become even more acute when intermittently bonding at least one continuously moving web using a rotary ultrasonic horn. Operation of a rotary ultrasonic horn includes movement inherent in the continuous vibration of the horn at a given frequency and amplitude to efficiently bond the web. as well as rotation of the horn along the length of a web which may vary in thickness along the length of the web, thus to impose varying resistance to the nip pressure applied by the combination of the horn and the anvil on the web. Under certain conditions, such vibratory movement of the horn, and variation of web thickness, either alone or in combination, may adversely affect bond consistency and quality in the web.

For example, because the ultrasonic horn must vibrate at its resonant frequency like a bell. the shaft supporting the horn cannot be rigidly mounted e.g. to a frame. The need to provide non-rigid mounts for e.g. non-rigid mounting corresponds with a tendency for the horn to be deflected from a desired position under the nip forces required to achieve bonding using ultrasonic energy to develop the desired bonds or to be deflected, under its own dead weight. Typically, the rotary ultrasonic horn has conventionally been mounted in a cantilevered configuration which enhances the amount by which the position of the horn is changed when going from a dead-weight self-supporting mass being acted on by gravity to a fully loaded bond nip.

For example, a horn assembled in a conventional and typical mount extends from a generally horizontal shaft. The shaft rests on rubber O-rings. When the horn is so mounted in a generally horizontal orientation, with the O-rings taking the load, the axis of the horn sags out of true alignment with the shaft support structure which supports the shaft, the horn, and optionally the drive mechanism. Such sag is typically about 0.015 inch at the horn face for a 20 pound horn.

In addition, where the web advancing through the nip, defined between the horn and the anvil, varies in thickness and/or density the web applies a correspondingly varying back pressure on the horn and anvil. The overall result of nip variation, then, can be defined in terms of the combination of the degree of variability in manufacturing and mounting the horn and anvil, as well as the degree of variability in thickness of the web moving through the nip between the anvil and horn.

These difficulties are even further exacerbated when the rotary ultrasonic bonding includes an intermittent bond pattern as discussed above such that a discrete raised array of bonding projections is introduced into the nip at the initiation of bonding of each bond region.

It is an object of this invention to provide bonding apparatus and methods wherein nip pressure is more consistent along the lengths and widths of respective bonding regions.

It is a more specific object to provide rigid and stiff bonding apparatus wherein reduced interference can be employed while achieving an effective level of nip loading at the bonding nip.

It is a further object to provide a method for developing bond consistency between bond regions while attenuating pressure and bond variation internal to the respective bond regions.

SUMMARY

The invention is defined in a first family of embodiments comprehending ultrasonic bonding apparatus for intermittently creating ultrasonic bonds in sequentially advancing work piece segments. in a nip. The work piece segments to be bonded are up to about 0.25 inch thick. The ultrasonic bonding apparatus comprises a frame. Anvil support apparatus defines an anvil loading assembly connected to the frame, and supporting an anvil roll mounted for rotation about a first generally horizontal axis. The anvil roll comprises a first relatively smaller radius portion extending about a first portion of a circumference of the anvil roll, and at least one raised bonding portion having a second relatively larger radius extending about a second portion of the circumference of the anvil roll. Horn support apparatus is connected to the frame, and supports a rotary ultrasonic horn mounted for rotation about a second generally horizontal axis, and aligned with the first generally horizontal axis. The ultrasonic horn and the anvil roll are collectively mounted and configured such that the ultrasonic horn and the anvil roll can be brought together to define a nip therebetween, and wherein the anvil roll and the ultrasonic horn can rotate in common with movement of work piece elements through the nip, and intermittent passage of the raised bonding portion through the nip. The frame, the anvil support apparatus, and the horn support apparatus collectively are sufficiently rigid that the horn and the anvil roll can be brought together with interference levels of from about 0.000 inch to about 0.008 inch at the raised bonding portion in combination with defining sufficient nip pressure to develop ultrasonic bonds in the work piece segments passing through the nip.

In some embodiments, a width is defined between the ultrasonic horn and the anvil roll, and the anvil support apparatus includes a resilient support member defining a resistance, to withdrawal of the anvil roll from the nip, of about 400 pounds per inch width of the nip.

In some embodiments, the anvil support apparatus further comprises a lifting plate for lifting and lowering the anvil loading assembly with respect to the ultrasonic horn.

In some embodiments, the anvil support apparatus further comprises a pivot plate pivoting the anvil loading assembly about a third axis oriented perpendicular to the first axis.

Some embodiments can include a stop defining a limit to downward travel of the anvil loading assembly.

Preferred embodiments include a back-up roll mounted above the ultrasonic horn, and wherein the back-up roll engages an outer surface of the ultrasonic horn in alignment with the first and second axes.

Preferred embodiments include an adjusting screw, operating on a cradle arm, for adjusting a height of the back-up roll, and thus generally defining an upper limit to movement of the ultrasonic horn.

Preferred embodiments can include first and second support rolls releasably supporting opposing sides of an outer surface of the ultrasonic horn.

Preferably, the first and second support rolls are positioned lower than the axis of the ultrasonic horn, whereby urging the first and second support rolls inwardly against the outer surface of the ultrasonic horn lifts the ultrasonic horn upwardly against the back-up roll.

Preferably, the first and second support rolls are mounted to a horn support plate through an activation assembly, the horn support apparatus further comprising equalizer arms mounted to the horn support plate, and equalizing inward and outward movement of the first and second support rolls.

In a second family of embodiments, the invention comprehends a method of intermittently creating ultrasonic bonds in sequentially advancing work piece segments, wherein the work piece segments to be bonded are up to about 0.25 inch thick. The method comprises passing the work piece segments through a nip defined by a frame, anvil support apparatus, and horn support apparatus. The anvil support apparatus defines an anvil loading assembly connected to the frame and supporting an anvil roll mounted for rotation about a first generally horizontal axis. The anvil roll comprises a first relatively smaller radius portion extending about a first portion of a circumference of the anvil roll and at least one raised bonding portion having a second relatively larger radius extending about a second portion of the circumference of the anvil roll. The horn support apparatus is connected to the frame, and supports a rotary ultrasonic horn mounted for rotation about a second generally horizontal axis, the second axis being aligned with the first axis. The method further comprises bringing the ultrasonic horn and the anvil roll together in defining the nip, with interference of about 0.000 inch to about 0.008 inch at the raised bonding portion, and correspondingly developing suitable pressure in the nip to create ultrasonic bonds. In some embodiments, in the case where interference is substantially 0.000 inch, the combination of work piece segment(s) in the nip and amplitude of the horn face when vibrating generate the desired nip pressure. The method includes activating ultrasonic energy in the ultrasonic bonding horn, and rotating the ultrasonic horn and anvil roll in common with movement of the work piece segments through the nip, and thereby intermittently applying pressure to the work piece segments at the raised bonding portion, and creating ultrasonic bonds in the work piece segments passing through the nip.

The method can include applying first and second support rolls to sides of the ultrasonic horn and lifting the ultrasonic horn into engagement with a back-up roll aligned with the first and second axes such that the first and second support rolls, in combination with the back-up roll, define a fixed location of the ultrasonic horn.

The method can also include applying the first and second support rolls to the sides of the ultrasonic horn at locations lower than the second axis, and urging the first and second support rolls against the ultrasonic horn and thereby lifting the ultrasonic horn into engaging relationship with the back-up roll.

In preferred embodiments, the method includes, prior to lifting the ultrasonic horn into engagement with the back-up roll, moving the back-up roll to the sag distance of the ultrasonic horn about 0.015 inch such that upon the horn being lifted into engagement with the back-up roll, substantially all sag is removed from the ultrasonic horn. Thus, weight load of the ultrasonic horn is substantially dissipated for the O-rings closest to the face of the ultrasonic horn.

In preferred embodiments, the method includes bringing the anvil roll and the ultrasonic horn together primarily by lifting the anvil roll, thereby to bring the anvil roll into engaging relationship with an outer surface of the ultrasonic horn.

In some embodiments, the method includes pivoting the anvil roll about an axis perpendicular to the first axis thereby to bring the first axis into alignment with the second axis, and accordingly to bring the working surface of the anvil roll into a parallel relationship with the outer bonding surface of the ultrasonic horn.

Preferred methods include limiting downward movement of the anvil loading assembly and thereby preventing disengagement of drive gears which transmit drive power between the anvil support apparatus and the horn support apparatus.

The method preferably includes controlling the height of the back-up roll and thereby controlling height of the ultrasonic horn, by adjusting the height of the cradle arm connected to the back-up roll with e.g. an adjusting screw.

In repeated use of the bonding system of the invention, the method includes releasing the support rolls and the back-up roll from engagement with the ultrasonic horn e.g. at the end of a bonding project, and re-engaging the support rolls and back-up roll with the ultrasonic horn at initiation of a subsequent project, and thereby returning the ultrasonic horn to the same defined location.

In a third family of embodiments, the invention comprehends a method of intermittently creating ultrasonic bonds in sequentially advancing work piece segments, wherein the work piece segments to be bonded are up to about 0.25 inch thick. The method comprises passing the work piece segments through a nip defined by a frame, anvil support apparatus, and ultrasonic horn apparatus. The anvil support apparatus defines an anvil loading assembly connected to the frame and supporting an anvil roll mounted for rotation about a first generally horizontal axis. The anvil roll comprises a first relatively smaller radius portion extending about a first portion of a circumference of the anvil roll and at least one raised bonding portion having a second relatively larger radius extending about a second portion of the circumference of the anvil roll. The horn support apparatus is connected to the frame, and supports a rotary ultrasonic horn mounted for rotation about a second generally horizontal axis. The second axis is aligned with the first axis. The method comprehends bringing the horn, mounted below the back-up roll, into engagement with the back-up roll, and bringing the anvil roll into contact with the ultrasonic horn thus defining the nip, and correspondingly developing suitable pressure in the nip to create ultrasonic bonds. The method further includes activating ultrasonic energy in the ultrasonic horn, and rotating the ultrasonic horn and anvil roll in common with movement of the work piece segments through the nip, and thereby intermittently applying pressure to the work piece segments at the raised bonding portion, and creating ultrasonic bonds in the work piece segments passing through the nip at the raised bonding portion.

Figure 1:
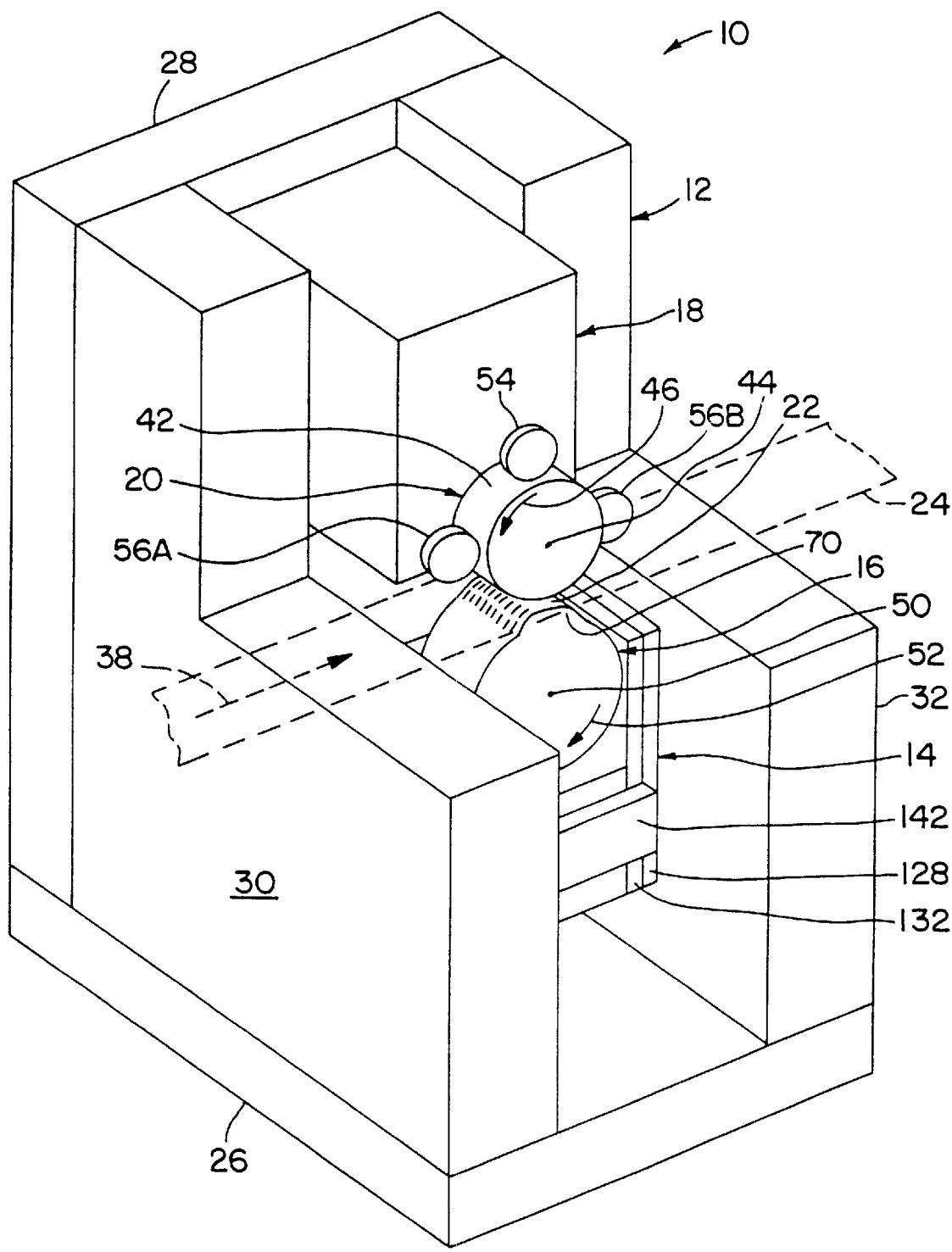
FIG. 1 shows an overall representative pictorial view of bonding apparatus of the invention, including ultrasonic horn and support apparatus, anvil and support apparatus, and a frame supporting both the horn and the anvil.

The invention is not limited in its application to the details of construction or the arrangement of the components set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

This invention provides apparatus and methods for developing ultrasonic bonds on a continuously moving web. The apparatus and methods can be used for developing an overall bonding pattern in the web, for bonding a second web to a first web, for bonding discrete elements to the web, and for developing bonded regions spaced along the length and/or width of the web. Apparatus and methods of the invention are particularly useful for e.g. ultrasonically bonding selected components to absorbent articles using a rotary ultrasonic horn and cooperating rotary anvil. The apparatus and methods can be used for bonding two webs to each other to form a composite e.g. substrate material, and wherein the composite substrate material is optionally used subsequently in an absorbent article such as, for example, a disposable diaper. The present invention is particularly useful in bonding one or more layers of material which preferably are made, at least in part, from thermoplastic polymers.

In particular, ultrasonic apparatus and methods of the present invention can be used, for example, to form a waist band in a disposable diaper. Such waist band may be formed e.g. by bonding a waist band element to a substrate web or by forming bonds internally within the web. In the alternative, apparatus, and methods of the invention can be used e.g. to attach mounting ears to a diaper, to attach a landing strip to a diaper, or to form side seams on training pants. In addition, apparatus and methods of the present invention can be used in manufacture of absorbent articles other than diapers, such as, for example, training pants, feminine care products, incontinence garments, hospital gowns, and the like. All such alternative methods, configurations, and articles are contemplated as being within the scope of the present invention. In light of the disclosure herein, other uses of the invention in connection with absorbent and other articles of manufacture will be obvious to those skilled in the art.

Where the invention is used in making waist bands, the heights of the waist bands may be aligned along the length of the web, such that bonding of the waist band regions represents an intermittent and timed discontinuous bonding process, having non-bonded areas of the web disposed between longitudinally spaced waist-bonded regions. So-bonded waist band regions enhance fit and comfort of the diaper about the waist of the wearer.

Figure 2:
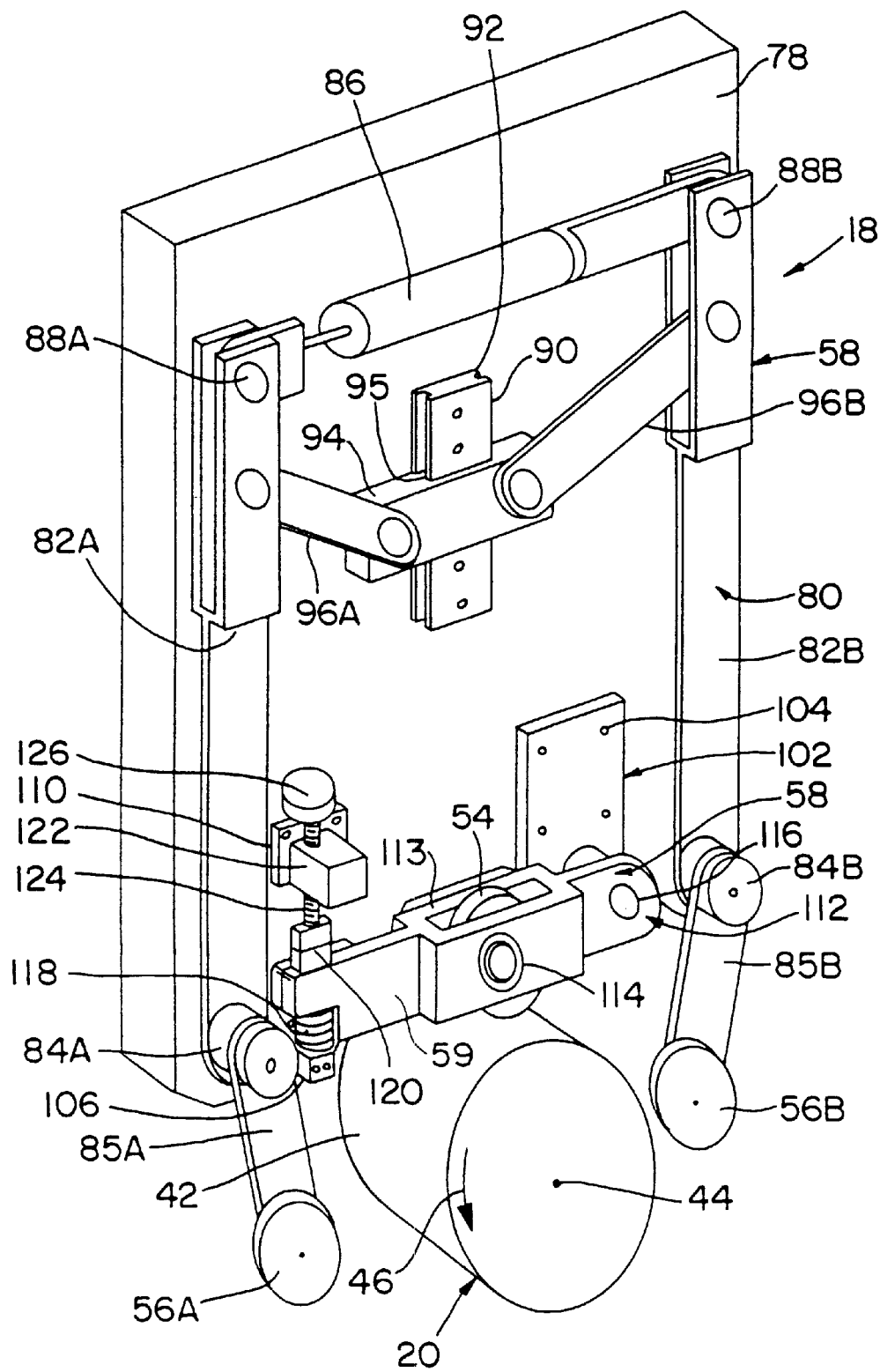
FIG. 2 shows a more detailed representative pictorial view of ultrasonic horn support apparatus illustrated in FIG. 1.
Figure 3:
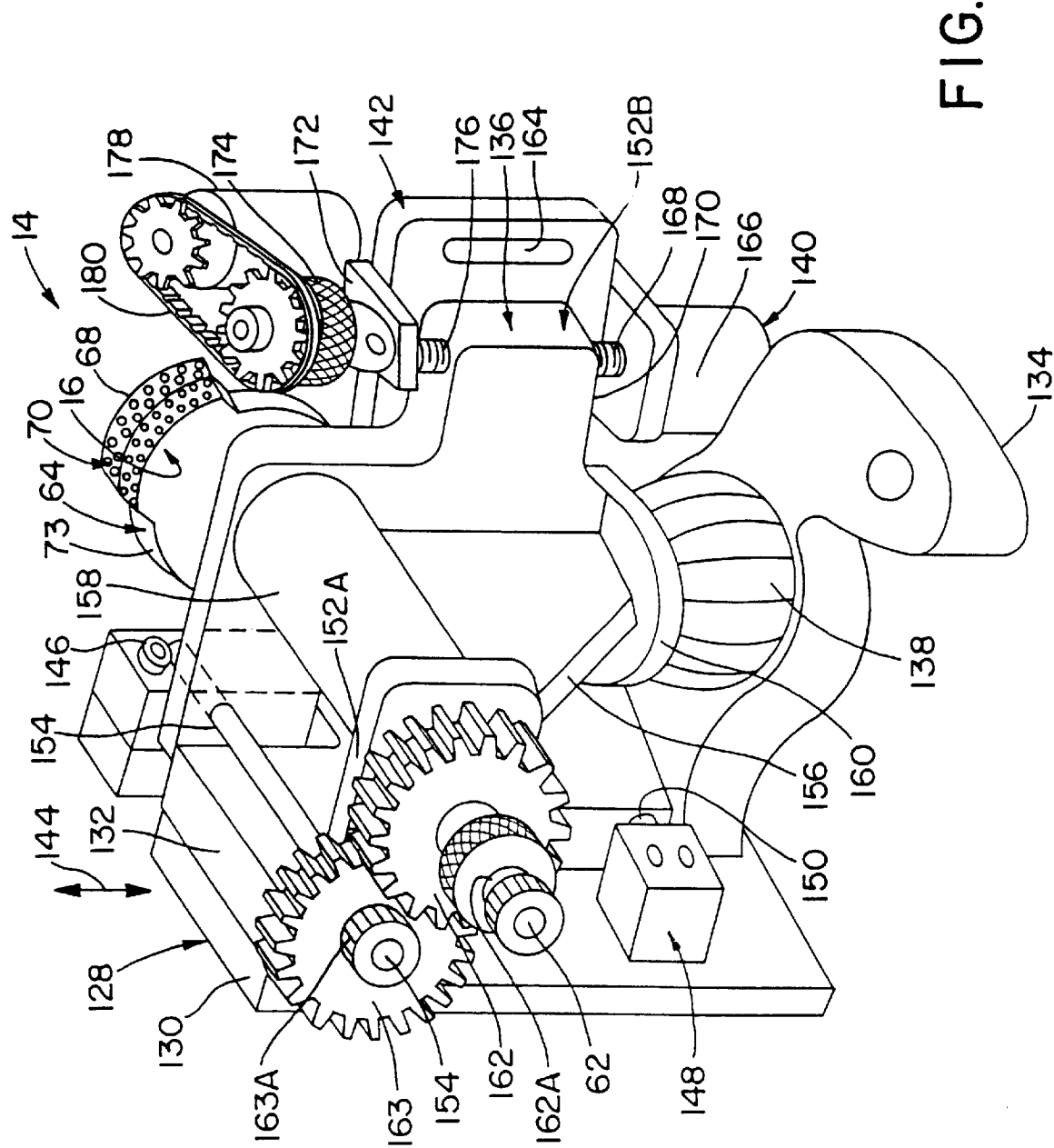
FIG. 3 shows a more detailed representative pictorial view of anvil support apparatus illustrated in FIG. 1.
Figure 4:
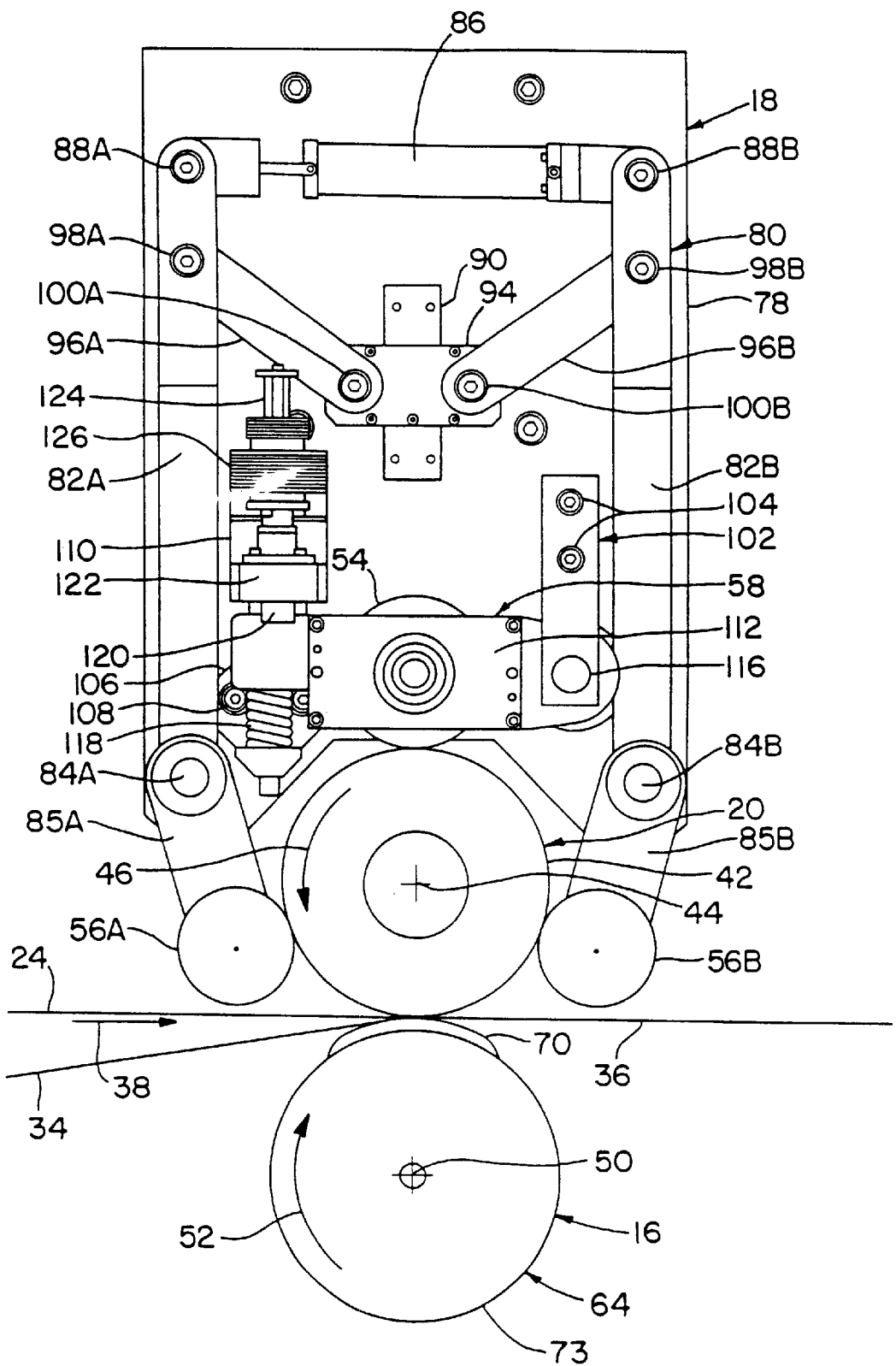
FIG. 4 shows a front elevation view of a representative ultrasonic horn support apparatus illustrated in FIG. 1, showing first and second webs progressing through a nip defined between an ultrasonic horn and a cooperating anvil.

Referring to the drawings, FIG. 1 illustrates in semi-block format, the general locations of the major elements and assemblies of apparatus of the invention. As illustrated in FIG. 1, bonding apparatus 10 of the invention generally comprises a frame 12, anvil support apparatus 14 supporting an anvil roll 16, and horn support apparatus 18 supporting an ultrasonic horn 20. Together, horn 20 and anvil roll 16 form a bonding nip 22 which is illustratively bonding a web 24 shown in dashed outline passing through the nip. FIGS. 2 and 4 illustrate details of horn support apparatus 18. FIG. 3 illustrates details of anvil support apparatus 14.

Referring back to FIG. 1, frame 12 is fabricated from a rigid, stiff material such as metal. Preferred metals include a variety of well known stiff and rigid steel or cast iron compositions. Frame 12 includes a base plate 26, a rear plate 28 rigidly mounted to base plate 26 e.g. by welding or bolting, and left and right side plates 30, 32, each being respectively rigidly mounted to both base plate 26 and rear plate 28 e.g. as by welding or bolting. Side plates 30, 32 are each rigidly mounted to both base plate 26 and rear plate 28 whereby the so-defined frame 12 provides a support assembly suitably rigid for supporting the anvil support structure and the horn support structure, thereby to provide an increased level of structural rigidity at nip 22 while also providing for release from such rigidity to accommodate variations in thickness of the e.g. web material passing through the nip.

Referring now to FIGS. 1 and 2, horn support apparatus 18 can be used in combination with anvil support apparatus 14 to develop bonds in a continuously moving substrate web 24. In the alternative, anvil support apparatus 18 and horn support apparatus 14 can be used to bond two or more substrate webs 24, 34 to each other as illustrated in FIG. 4 or to bond discrete elements to a substrate web or discrete elements to each other when at least one of the elements is already mounted or bonded to such web. In any event, a continuous web is preferably involved in the bonding process, whether as a support for elements being bonded to each other, as a continuous element being bonded either to another continuous element or to discrete spaced elements, or as a continuous element being bonded internally within its own structure. Substrate web 24 is continuously moving along a substrate path 36 in the direction indicated by arrow 38.

The Rotary Ultrasonic Horn

Horn support apparatus 18 includes rotating ultrasonic horn 20 as a bonding roll supported adjacent and above substrate web 24. Horn 20 has an outer peripheral bonding surface 42 which contacts and acts upon substrate web 24, and which rotates about a horn axis 44 in the direction indicated by arrow 46. Rotatable anvil roll 16, part of anvil support apparatus 14, is located adjacent horn 20. Anvil roll 16 is configured to rotate about anvil axis 50 in the direction indicated by arrow 52 associated therewith to press substrate web 24 against bonding surface 42 of horn 20, thereby creating bonds at substrate web 24.

In the embodiments illustrated in FIGS. 1, 2, 4, and 5, outer peripheral bonding surface 42 is contacted and supported by back-up roll 54 and first and second support rolls 56A and 56B. In the illustrated examples, rolls 54, 56A, and 56B are spaced at regular intervals about outer peripheral bonding surface 42 of horn 20 so as to maintain the horn in a substantially fixed position while the horn is being used to form ultrasonic bonds.

Horn support apparatus 18 includes horn support assembly 58 which is configured to bring support rolls 56A and 56B into contact with outer bonding surface 42 of horn 20, and raise horn 20 into contact with the outer surface of back-up roll 54. In addition, horn support apparatus 18 is configured to retract support rolls 56A, 56B from contact with the outer surface of horn 20, at desirable stages of a bonding operation.

For example, when no active bonding operation is being performed, the horn is typically kept vibrating, but rotation of horn 20 is typically stopped. To the extent rolls 54, 56A, 56B remain in forced engaging contact with horn 20, flat spots develop on outer surface 42 of the horn. Such flat spots are expressed in subsequent bond formation in the form of loci of deviation from the desired consistency of bond development. Such flat spots also tend to impose stress on ultrasonic horn 20, thereby contributing to wear of the horn as well as cracking and failures of horn 20. Therefore, it is desirable to remove all supporting contact from horn surface 42 at any time the horn ceases to rotate. Such removal of surface support contact is effected by withdrawing rolls 56A, 56B, from the sides of horn 20, whereupon the weight of the horn causes the horn to sag by gravity, away from, and out of contact with, back-up roll 54.

As representatively illustrated in the drawings, in this invention, ultrasonic horn 20 is mounted above anvil roll 16. Horn support assembly 58 is provided to retract support rolls 56A, 56B from contact with outer peripheral bonding surface 42 of horn 20.

As representatively illustrated in FIGS. 1, 2, 4, and 5, horn 20 is configured to rotate about horn axis 44 in the direction indicated by arrow 46 associated therewith. Horn 20 can be connected to a shaft 76 by suitable means such as by using a continuous one-piece design, or studs, welds, bolts, screws, matching key and key way, and the like. Other rotating components of horn support apparatus 18 can be similarly connected to each other as desired, to rotate in common with each other. Horn 20 is accordingly connected to frame 12 through horn support apparatus 18.

In general, conventional ultrasonic excitation crystals (piezoelectric crystals) are operationally connected to horn 20 through suitable amplifier and wave guide structure 61, so as to implement radially-directed ultrasonic vibrations in annular horn 20. Amplifier and wave guide structure 61 also functions as a portion of shaft 76 supporting the horn. Rotary horn 20 is generally disc-shaped although the precise outer configuration of the horn varies considerably from horn to horn in accord with other horn variables.

As representatively illustrated in FIGS. 1, 2, and 4, horn 20 generally comprises a shaped metal object. Representative examples of rotary ultrasonic horns which can be used in the present invention are described in U.S. Pat. No. 5,096,532 to Neuwirth et al and U.S. Pat. No. 5,110,403 to Ehlert, both of which are herein incorporated by reference in their entireties. In general, rotary ultrasonic horn 20 can be made from any metal having suitable acoustical and mechanical properties. Suitable metals include aluminum, monel, titanium, and some alloy steels. Titanium is preferred for its overall combination of desirable properties. In general, variables such as diameter, mass, width, thickness, and configuration of the rotary ultrasonic horn can be varied within substantial ranges. However, such variables, along with composition of the horn, do determine the particular frequency and amplitude at which a particular rotary ultrasonic horn resonates, which can affect bond quality and consistency. In particular, diameter, width, and thickness of the horn are selected such that the horn, upon being excited by ultrasonic energy at a desired frequency, is adapted to resonate such that the excited end moves substantially in phase with movement of the excitation source, and the bonding surface 42 also moves in a suitable pattern which is directed generally perpendicular to annular bonding surface 42 of the horn.

Typically, ultrasonically induced movements of the opposite ends of the horn relative to each other may be out of phase. For example, the rotary ultrasonic horn illustrated in the drawings can be excited at a frequency of from about 18 kHz to about 60 kHz. Horn 20 typically has a diameter of from about 4 centimeters to about 18 centimeters. Thickness of the horn at rotational axis 44 is typically from about 0.06 centimeters to about 15 centimeters. The horn can have a mass in the range of from about 0.06 kilograms to about 30 kilograms.

Horn support apparatus 18 includes a drive mechanism 60 which rotates and ultrasonically excites horn 20. Drive mechanism 60 can include the above noted piezoelectric crystals, the amplifier, and part or all of the wave guide. Any mechanism which provides the desired rotation and ultrasonic excitation can be used in the present invention. Such mechanisms are well known to those skilled in the art.

For example, drive mechanism 60 can be a mechanism commercially available from Dukane Corporation, St. Charles, Ill. or a similar system available from Branson Sonic Power Company, Danbury, Conn. Namely, a generator such as a Dukane 1800 watt, 20 kHz generator (Part No. 20A1800), is connected to a drive assembly, such as a Dukane drive assembly (Part No. 110-3123), to provide the necessary ultrasonic excitation. Any combination of boosters, such as a Dukane 1:1 booster (Part No. 2177T) and a Dukane 2:1 booster (Part No. 2181T), may then be attached to the drive assembly. Finally, rotary ultrasonic horn 20 of the present invention is attached to the boosters. Thus, the combination of generator, drive assembly, and boosters, functioning as drive mechanisms 60, rotates and ultrasonically excites rotary ultrasonic horn 20 thereby providing the ultrasonic energy and rotational motion necessary to bond substrate webs 24, 34, or substrate web 24 and discrete elements, to each other under suitable nip pressure.

Addressing now the support of the horn as illustrated in the drawings, horn 20, along with drive mechanism 60, is generally supported in a cantilevered arrangement. on e.g. rubber O-rings 74 (FIG. 5) disposed about shaft 76. The O-rings support both the horn and the drive mechanism from shaft support structure (not shown). Given the weight of horn 20, along with the weight of the drive mechanism, when the weight of the horn and drive mechanism are fully supported by only the O-rings, the weight of the combination of the horn and drive mechanism compresses the resilient O-rings, whereby the horn sags out of true alignment with the shaft support structure which supports shaft 76, the horn, and the drive mechanism. At full sag, and assuming no change in other roll support structure positionings, a horn weighing e.g. twenty pounds moves a distance of e.g. about 0.015 inch away from back-up roll 54.

Support rolls 56A, 56B can be spaced around horn 20 in any manner which supports horn 20 in a substantially fixed position during bonding operations, and a position to which horn 20 can be repeatedly returned. Back-up roll 54 preferably engages horn 20 opposite anvil roll 16, thus to provide straight, in-line back-up support to horn 20 through axis 44, whereby horn 20 can be relatively rigidly supported against the upward force exerted by anvil roll 16 against horn 20 while avoiding harmful bending stresses on shaft 76 and compressing forces on O-rings 74, thereby to develop bonding forces in nip 22.

Back-up roll 54, and support rolls 56A, 56B can be made from any suitable material capable of holding horn 20 in a substantially fixed position. Exemplary materials for rolls 54, 56A, 568 include metal such as steel and alloys of other metals, rubber, urethane, and other durable materials capable of withstanding the pressure and ultrasonic energy environments imposed on the respective rolls. In one embodiment. rolls 54, 56A, 56B are configured to contact bonding surface 42 of horn 20. Desirably, the support rolls, through frictional engagement with horn 20, rotate with the horn to effectively support the horn without adversely affecting rotation or ultrasonic vibration of the horn. Rolls 56A, 56B can include ball bearings as supports for the rolls, can comprise bearings per se, or can comprise idler rolls, as are known to those skilled in the art, configured to contact bonding surface 42 of horn 20.

Referring to FIGS. 2 and 4, horn support apparatus 18 comprises a horn support plate 78. Support roll guide mechanism 80 includes upstanding first and second lever arms 82A, 82B mounted for pivotation with respect to plate 78 at pivot anchors 84A, 84B. Support arms 85A, 85B extend from lever arms 82A, 82B at pivot anchors 84A, 84B respectively, and move in unison with the respective lever arms, to move rolls 56A, 56B into and out of engagement with outer surface 42 of horn 20. Power cylinder 86 extends between lever arms 82A and 82B, and is mounted for pivotation with respect to lever arms 82A, 82B at pivot pins 88A, 88B, and provides the motive power moving the lever arms toward and away form each other. Cylinder 86 can be e.g. an air cylinder or an hydraulic cylinder. However, an air cylinder is preferred because of the ability of compressed air in the cylinder to absorb, better than hydraulic fluid, shock forces which may be imposed on the system.

Bearing race 90 is rigidly mounted to horn support plate 78 and includes ball tracks 92 (FIG. 2). Linear bearing top-mounting plate 94 includes a linear bearing 95 including ball bearings (not shown) which run in ball tracks 92, whereby linear bearing top-mounting plate 94 slides up and down on bearing race 90. Equalizer arm 96A is pivotally mounted to lever arm 82A at pivot pin 98A and is pivotally mounted to linear bearing top-mounting plate 94 at pivot pin 100A. Equalizer arm 96B is pivotally mounted to lever arm 82B at pivot pin 98B and is pivotally mounted to linear bearing top-mounting plate 94 at pivot pin 100B. Since linear bearing top-mounting plate 94 can travel only upward and downward on bearing race 90, equalizer arms 96A, 96B, in combination, control the movement of lever arms 82A, 82B such that the lever arms are forced to move equal distances inward or outward upon activation of power cylinder 86. Correspondingly, support arms 85A, 85B are forced to move equal distances inward or outward, toward or away from horn 20, upon activation of power cylinder 86. Thus, providing for corresponding set-up, when power cylinder 86 is extended, support arms 85A, 85B move predictably equal distances toward horn 20, whereby support rolls 56A, 56B support ultrasonic horn 20 at a known location in space each time the support rolls engage the horn.

Since rolls 56A, 56B are below axis 44 of cylindrical horn 20, movement of the support arms inwardly into contact with horn 20 provides a lifting vector lifting the horn upwardly. Depending on the distance by which the support rolls lift the horn, support arms 85A, 85B can preferably bring horn surface 42 into surface engagement with back-up roll 54.

Back-up roll 54 is supported by cradle arm 112 which is connected to horn support assembly 58. Horn support assembly 58 additionally includes mounting bracket 102 rigidly mounted to support plate 78 at e.g. bolts 104. Spring mounting plate 106 is rigidly mounted to support plate 78 by bolts 108. Similarly, adjustment mounting plate 110 is rigidly mounted to support plate 78. Spring 118 is disposed between cradle arm 112 and spring mounting plate 106.

As illustrated in FIG. 2, horn support assembly 58 includes cradle arm 112 and back-up roll 54. Cradle arm 112 includes cradle 113 which extends on both sides of back-up roll 54. Back-up roll 54 is mounted to cradle 113 between equivalent bearings 114 which are on opposing sides of roll 54. Using bearings 114 on opposing sides of back-up roll 54, assuming that the axes of rotation of horn 20 and back-up roll 54 are substantially aligned, and directing back-up forces through axes 44 and 50, urges backup roll 54 to apply back-up forces in alignment with the axes of both horn 20 and backup roll 54, thereby avoiding back-up roll 54 applying cantilevered back-up forces. Cradle arm 112 is mounted for pivotation with respect to mounting bracket 102 at pivot pin 116, and extends from mounting bracket 102 to spring mounting plate 106.

Accordingly, when properly set up with the axes of the horn, the back-up roll, and anvil roll 16, parallel to each other, and aligned in a single plane, the pressure applied by the outer working surface of back-up roll 54 to outer bonding surface 42 of the horn influences the spacial orientation of the outer bonding surface of the horn to track parallel to outer working surface 64 of anvil roll 16, such that the outer bonding surface of horn 20 can more closely track the incoming and outgoing portions of path 36 traversed by web 24, with only minimal deviation of bonding surface 42 from the path in accord with pressure applied at nip 22.

Cradle arm 112 is mounted on top of compression spring 118. A load cell 120 is disposed above cradle arm 112, at the spring end of the cradle arm. Above load cell 120, adjusting block 122 is rigidly mounted to adjustment mounting plate 110. Adjustment screw 124 extends through threaded adjusting block 122 and abuts load cell 120. Adjusting knob 126 is secured to adjusting screw 124. Turning knob 126 turns screw 124 and thus effectively raises or lowers the lower end of the adjusting screw and correspondingly load cell 120, and the corresponding end of cradle arm 112. Thus, by turning adjustment knob 126, one can pivot the back-up roll with respect to support plate 78 at pivot pin 116, thereby raising or lowering back-up wheel 54 with respect to horn 20.

Spring 118 keeps load cell 120, disposed on cradle arm 112, in contact with adjusting screw 124 when support rolls 56A, 56B are retracted. Keeping load cell 120 in contact with adjusting screw 124 when support rolls 56A, 56B are retracted provides a mechanism to ensure that back-up roll 54 does not drop down and establish contact with horn 20, when the machine is stopped, but horn 20 is vibrating. Adjusting block 122 and adjusting screw 124 bear against cradle arm 112 through load cell 120 thus to control the positioning of back-up roll 54 against horn 20.

In general, then, support roll guide mechanism 80 controls movement of support rolls 56A, 56B into and out of support of horn 20; and horn support assembly 58, via cradle arm 112, controls the base-line location of back-up roll 54 relative to horn 20. The use of load cell 120 provides a mechanism to measure the nip force between ultrasonic horn 20 and rotary anvil roll 16.

The Rotary Anvil

As representatively illustrated in the drawings, anvil roll 16 is configured to rotate about anvil axis 50, and to press substrate web 24, optionally along with a second element or web 34 to be bonded thereto, against bonding surface 42 of the ultrasonic horn. The anvil roll is connected to a shaft 62 (FIG. 5) which is rotatably mounted and connected, as part of anvil support apparatus 14, to frame 12, by any suitable means such as conventional bearings. In general, anvil roll 16 can be made from any metal having suitable mechanical properties for tolerating the use environment, and the function of urging the materials to be bonded into bonding engagement with surface 42 of the ultrasonic horn. Suitable metals include, for example and without limitation, certain of the alloy steels.

Typically, anvil roll 16 has a width 66 of about 0.6 centimeter to about 50 centimeters, desirably from about 0.6 centimeter to about 15 centimeters. Operating surface 64 is configured to bond the substrate webs 24, 34, or a substrate web 24 and discrete elements, to each other at bond locations arranged in a predetermined bond pattern on operating surface 64. For example, as representatively illustrated in FIG. 6, anvil surface 64 of anvil roll 16 can have an array 67 of projections 68 thereon. The array of projections 68 can extend completely around the circumference of operating surface 64, and across the entirety of the transverse width of operating surface 64, thereby to cover substantially the entirety of the operating surface of the anvil roll.

Figure 6:
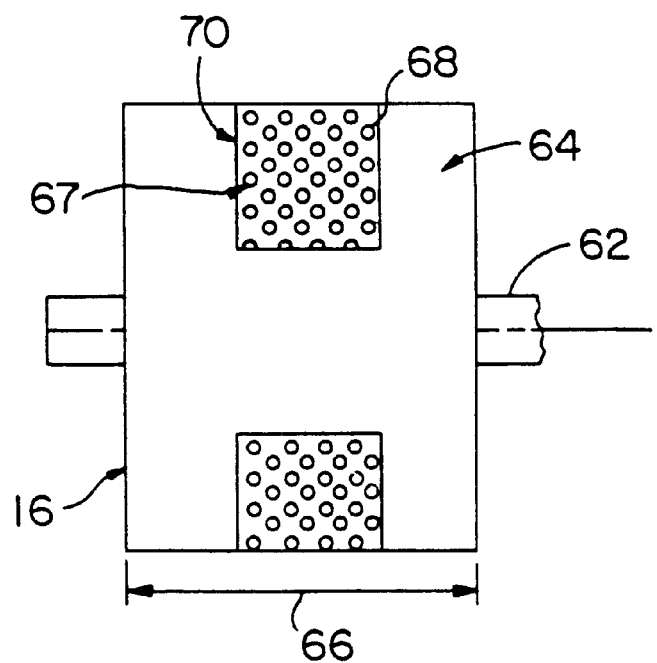
FIG. 6 shows a representative example of an anvil roll useful in the invention, including first and second bonding regions.
Figure 6A:
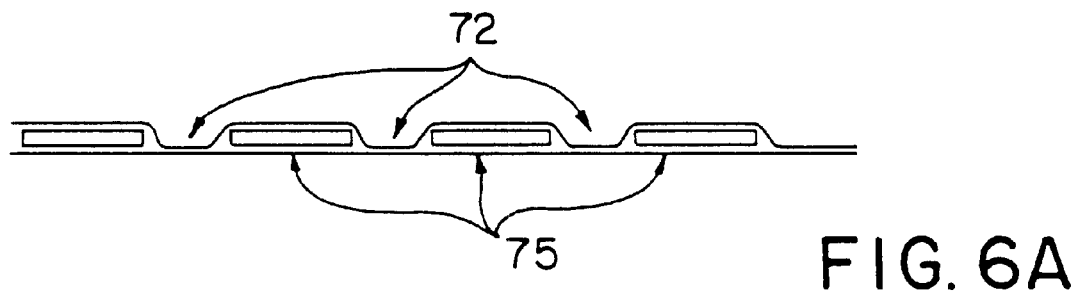
FIG. 6A shows a representative side elevation view of a composite substrate web which can be manufactured using apparatus and methods of the present invention.

In the alternative, projections 68 can be disposed, as shown in FIGS. 3, 6, in discrete spaced arrays which cover portions but not all of either or both of the circumference or width of the operating surface, of anvil roll 16.

Where an overall pattern is used, the projections suggest continuous bonding force being applied by anvil roll 16 against horn 20. To the extent suitable web or other material is in the nip between the horn and anvil, the continuous array provides for creating a continuous bond along the corresponding length of the web over substantially the entirety of the width of the nip.

Breaks in the array of projections, whether partial or full width, can result in bonds intentionally being developed over less than the entirety of the area of the material passing through the nip. Namely, the extent to which bonds are developed in nip 22, across the width of the web, depends on the degree to which the array of projections 68 or other elements extend across the width of the web. The pattern of projections about the circumference of the anvil generally controls the longitudinal arrangement of the bond pattern which can potentially be developed on the materials passing through the nip.

Projections 68 can be any size or shape, any orientation or distribution, depending on the bond pattern desired for the material passing through the nip. A preferred, but not limiting bond pattern, is represented by about 30 percent bond area and about 70 percent non-bond area.

Figure 7:
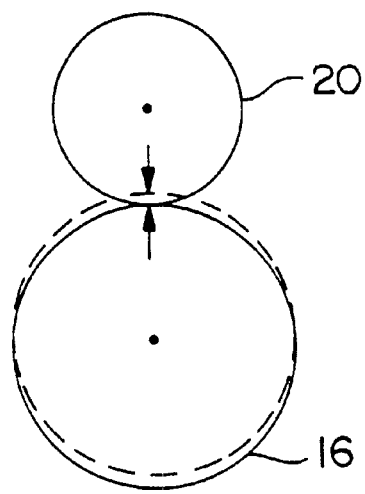
FIG. 7 shows a side elevation representation of the anvil roll and the horn, illustrating the inferred interference between the horn and anvil.

In preferred embodiments especially of interest in this invention, surface 64 of anvil roll includes a raised portion 70, also known as a "bump," illustrated in FIGS. 1, 3, and 4. In such embodiments, the array or arrays of projections are disposed on the raised portion or raised portions. Raised portion 70 is particularly useful when one of substrate webs 24, 34, or web 24 and discrete elements to be bonded thereto, have varying thicknesses as illustrated in FIG. 7. The principle of raised portion 70 is to provide a first larger radius portion of the anvil roll at 70 for providing bonding activity at thinner portions 72 of the web, and to provide a second relatively smaller radius portion 73 of the anvil roll. The second smaller radius portion of the anvil roll provides clearance between the anvil roll and the horn for passage of thicker portions 75 of the web between the anvil roll and the horn. In some embodiments, the first larger radius is about 0.01 inch to about 0.25 inch greater than the second smaller radius. The difference in radii is typically dependent, at least in part, on the thickness of non-bonded thicker portions 75 of the web.

Rotation of the anvil roll can be timed such that raised portion 70 of anvil roll surface 64 presses thinner portions 72 (FIG. 7) of substrate webs 24, 34 against bonding surface 42 of horn 20 with sufficient force to develop ultrasonic bonds at thinner portions 72 while thicker portions 75 of the web pass through the nip at the smaller radius portions 73 of the anvil roll. Typical of such thicker portions of the web are absorbent pads such as are used in disposable diapers, feminine hygiene pads, and the like.

Such timing of activation of the ultrasonic bonding can be beneficial to establishing and maintaining desirable levels of interference between bonding surface 42 and surface 64 of the anvil roll at the raised portions, while enabling the thicker portions of the web or other work piece to pass through the nip without being crushed.

When raised portion 70 passes into and through nip 22, the presence of the raised portion in combination with the planned interference between the raised portion and the horn, imposes a relatively increased level of stress on both the horn and the anvil in order to provide suitable force at the nip to develop ultrasonic bonds using the ultrasonic energy being expressed in horn 20. Correspondingly, when raised portion 70 is not in the nip, namely when a smaller radius portion 73 is in the nip, the nip force, if any, is substantially less than that required to form ultrasonic bonds. Thus, as the anvil and the horn rotate in an ongoing bonding process, raised portion 70 repeatedly passes into and out of the nip, repeatedly stressing both the anvil support structure and the horn structure, as well as frame 12 onto which are mounted both the anvil support,structure and the horn support structure.

Each introduction of increased stress includes both passive loading and impact loading. Particularly the impact loading can introduce significant variation in effective load along the machine direction length of the bonding surface defined by raised portion 70, due to reflex reaction of the respective support structures. As a result, bond strength can vary longitudinally along the length of an array of bond elements represented by the length of raised portion 70, and in some instances can vary along the width of such array.

For example, when anvil roll 16 is sufficiently loaded against horn 20 to develop ultrasonic bonds, as raised portion 70 enters the nip, the impact of the leading edge of the raised portion meeting the horn causes sufficient reactive relative movement of one or both of the horn or anvil roll away from the nip, as a "bounce," that the effective load in the nip directly downstream of the leading edge of raised portion 70 is less than the effective load at the leading edge or at the trailing edge of the raised portion.

Where the dead load applied by the anvil has been set for optimum ultrasonic bonding, the reduced load directly downstream of the leading edge of raised portion 70 results in less than optimum bonding, while desired bonding can be achieved elsewhere on the raised portion. If the dead load applied by the anvil is increased such that optimum bonding is achieved directly downstream of the leading edge in spite of the bounce, then optimum bonds may be achieved directly downstream of the leading edge, while the excessive loading elsewhere on raised portion 70 results in inferior bonds and may result in damage to the materials being bonded.

The force applied by anvil roll 16 at raised portion 70, against horn 20, is supported from frame 12 through anvil support apparatus 14. Referring to FIG. 3. anvil support apparatus 14 includes the rotating anvil roll 16 as an anvil supported adjacent and below path 36 of substrate web 24. Anvil roll 16 includes outer peripheral working surface 64, which includes raised portion 70 and smaller radius portion 73. Raised portion 70 contacts web 24 and, in combination with horn 20, acts upon web 24 in nip 22 to develop ultrasonic bonds while the anvil roll rotates about anvil roll axis 50 (FIG. 4) in the direction indicated by arrow 52.

Anvil support apparatus 14 includes anvil loading assembly 128. Anvil loading assembly 128 includes anvil lifting plate 130, anvil loading pivot plate 132, anvil bottom support plate 134, load transmission assembly 136, air bladder 138, stop cylinder 140, and longitudinal support plate 142.

Anvil lifting plate 130 is mounted to right side plate 32 of frame 12, and slides upwardly and downwardly with respect to right side plate 32 as indicated by the doubleheaded arrow 144, thereby to provide coarse up and down movements of the anvil loading assembly with respect to right side plate 32. In the illustrated embodiments, all other elements of anvil support apparatus 14 are mounted directly or indirectly to lifting plate 130. Lifting plate 130 is beneficial in that lifting plate 130 allows for the interchanging of different size anvils to accommodate the production of different size products. For example, if the anvil is a function roll and makes one revolution per product, the anvil roll circumference and thus anvil roll diameter must change as product length changes.

Pivot plate 132 is mounted to lifting plate 130 and pivots about lifting plate 130 at pivot pin 146. Pivot plate 132 pivots about pivot pin 146 to bring raised portion 70 into a parallel relationship with bonding surface 42 of horn 20. Spring block 148 is mounted to lifting plate 130. Spring 150 is located and provides relationship between spring block 148 and pivot block 132. Pivot plate 132 is pivoted about pivot pin 146 by extending and retracting a shaft (not shown), located on the far side of pivot plate 132, with respect to spring block 148.

Bottom support plate 134 extends outwardly from, and is rigidly mounted e.g. by welding or bolting, to lifting plate 130. Support plate 134 provides a rigid platform for receiving and supporting air bladder 138, and for receiving and transferring the supported force/load from bladder 138 to lifting plate 130 and load transmission assembly 136.

Load transmission assembly 136 includes first and second load arms 152A, 152B mounted to pivot plate 132 at e.g. pivot pin 154, for cooperative pivotation of arms 152A, 152B about pivot pin 154, thus to pivot the load transmission assembly about pivot plate 132.

Load transmission assembly 136 further includes transverse brace plate 156 which is rigidly mounted to load arms 152A, 152B, and accordingly connects, load arms 152A, 152B to each other, such that load arms 152A, 152B, and brace plate 156 move and otherwise act in unison as a unitary body.

Load transmission assembly 136 further includes cross tube 158 which extends between and is rigidly mounted to load arms 152A, 152B, and is also rigidly mounted to brace plate 156, so as to coact with load arms 152A, 152B, and brace plate 156. Further, bottom plate 160 is rigidly attached to brace plate 156 and to load arm 152B at bottom edges of the respective load arm and brace plate. Bottom plate 160 serves as an interface between the load transmission assembly and the air bladder.

Figure 3A:
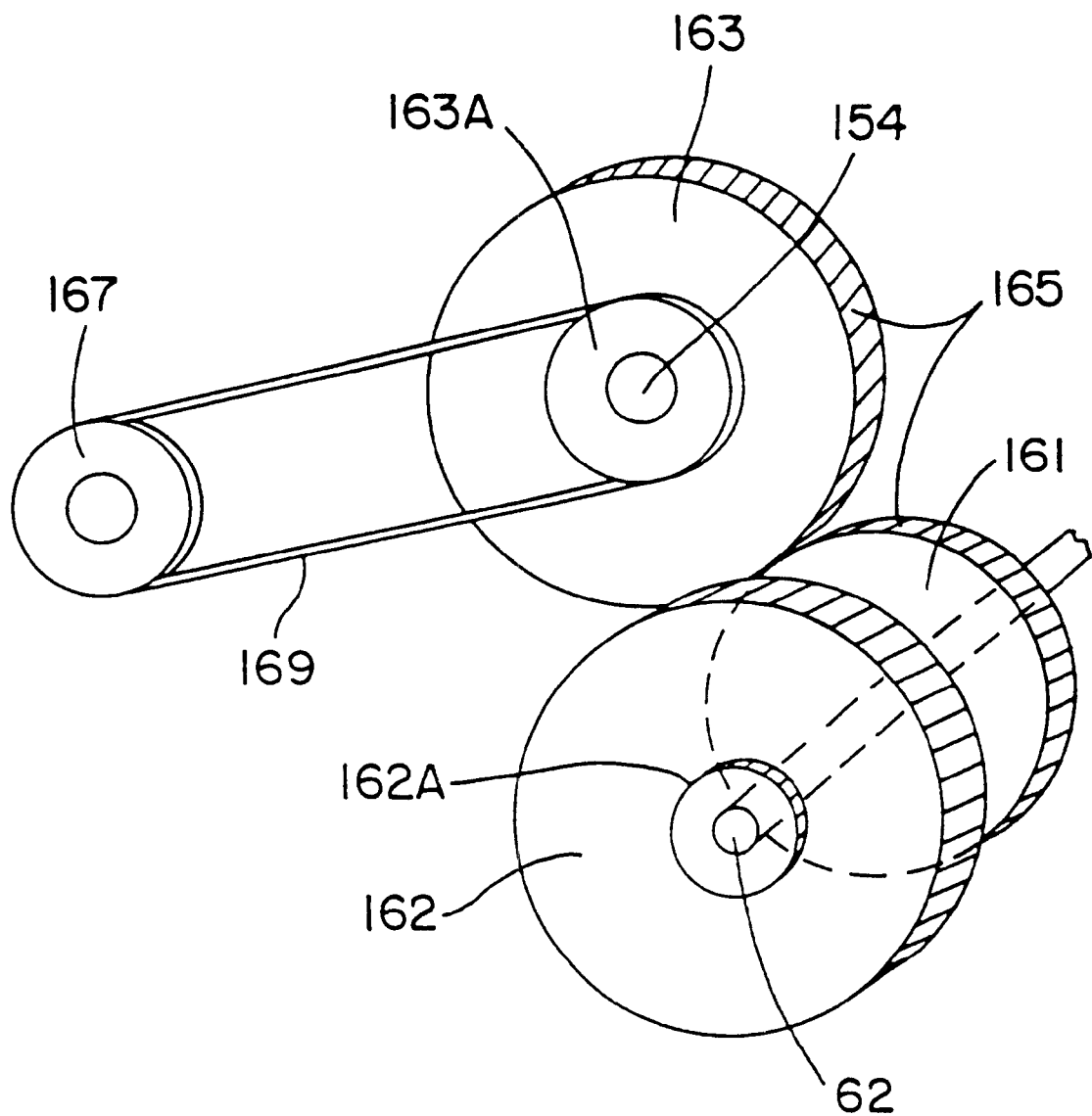
FIG. 3A shows a pictorial relational view of the gears of anvil support apparatus illustrated in FIG. 3.

Load transmission assembly 136 also includes the above discussed anvil roll 16, including raised portion 70 and smaller radius portion 73. The anvil roll is mounted through anvil shaft 62 to load arms 152A, 152B, preferably through bearings (not shown) at each of the load arms. Anvil shaft 62 extends through cross tube 158 between load arms 152A, 152B. Shaft 62 is visible outside the outer surface of load arm 152A. As illustrated in FIG. 3A, shaft 62 is connected to and rotates with drive gear 162 and drive gear 161. Drive gear 161 is hidden and behind drive gear 162 in FIG. 3, whereby anvil 16 rotates in unison with drive gears 161 and 162. Drive gear 161 interacts via meshing teeth 165 with drive gear 163 to rotate anvil roll 16. Generally, gears 161 and 163 are sized at a 1:1 ratio, but other embodiment are contemplated. In preferred embodiments, the gear ratio between gear 161 and gear 163 is such that gear 161 makes one revolution per product, since a single repeat anvil is preferably connected to the shaft.

A harmonic adjustor 162A is attached at one side to anvil shaft 62, and at the other side to gear 162. Gear 162 is preferably not keyed (locked) to shaft 62 except through harmonic adjustor 162A. Thus, turning of harmonic adjustor 162A causes drive gear 162 to precess relative to the anvil shaft 62 and anvil 16. Drive gear 162 drives the horn through a horn gear (not shown) on the horn canister. If drive gear 162 were not able to precess relative to shaft 62, the horn and anvil would be rigidly geared together, and every so often (depending on the gear ratios of anvil drive gear 162 and horn gear), the anvil pattern would hit the same spot on the horn. Because the horn is also oscillated in its axial direction, the pattern on the anvil generally does not regularly and repeatedly hit the same spot on the horn, since the added shifting of the anvil relative to the horn, caused by the motion of harmonic adjustor 162A helps distribute anvil pin wear on the horn face.

Drive gear 163 is connected to timing belt pulley 163A and driven by timing belt 169 via input drive timing belt pulley 167. Gear 163 drives gear 161, being disposed behind gear 162. Gear 162 connects to a drive gear (not shown) driving horn drive mechanism 60, whereby anvil 16 and horn 20 rotate cooperatively in combination with the passage of web 24 et al through nip 22.

The primary lifting force on anvil roll 16 is transmitted from lifting plate 130 through bottom support plate 134, through bladder 138, through load transmission assembly 136, and thence to anvil roll 16. Bladder 138 also serves as a shock absorber to receive and dissipate load shocks, e.g. impact load shocks, imposed on the load transmission assembly through anvil 16, especially at raised portion 70. In preferred embodiments, bladder 138 applies a lifting load of about 300 pounds on load cell 176. The respective e.g. 300 pound load registers at face value at load cell 176. To the extent some or all of the respective load is transferred to horn 20 through anvil 16, the load registering on load cell 176 is correspondingly reduced. Correspondingly, any load transferred from anvil roll 16 to horn 20 is registered as an additional load increment at load cell 120. Thus either load cell can be used to monitor and ultimately control the force in the nip 22 between ultrasonic horn 20 and the rotary anvil roll 16.

The amount of lifting force applied by bladder 138 should be sufficient to provide relative stability to anvil roll 16, while enabling the anvil roll to move away from the nip in the event an excess load is generated at the nip.

Longitudinal support plate 142 is rigidly mounted e.g. by welding or bolting to lifting plate 130. Support plate 142 serves as a stabilizing element and as a link between side plates 30, 32 of frame 12. In that regard, lifting plate 130 is rigidly mounted to side plate 32 (FIG. 1), and a bolt (not shown) extends through slot 164 of the support plate and secures support plate 142 to side plate 30. Such securement to side plate 30 is loosened for sliding lifting plate 130 upwardly or downwardly, depending on the size of the anvil, with respect to side plates 30, 32, and is then tightened to hold the support plate rigidly to side plate 30 at the selected elevation during routine use of the bonding apparatus.

Stop cylinder support bracket 166 is rigidly mounted to support plate 142 as by welding or bolting, and rigidly supports stop cylinder 140. Cylinder 140 includes extension rod end block 168 which extends toward, and is in alignment with, lower surface 170 of load arm 152B. Rod end block 168 can be extended or retracted to establish the lowest enabled point of travel of load transmission assembly 136 as lifting plate 130 is moved downwardly to lower anvil roll 16 away from horn 20. By establishing the lower limit of travel of load transmission assembly 136 at a height wherein gear 162 and the gear (not shown) driving the horn 163 remain engaged, disengagement of the anvil roll from the horn does not disengage the lower drive gears from the upper drive gears.

During routine operation of the bonding process, rod end block 168 is displaced somewhat downwardly from lower surface 170 of load arm 152B. Rod end block 168 can be raised or lowered routinely to adjust the desired lowest height of load arm 152, and thus the lowest height of load transmission assembly 136 with respect to lifting plate 130.

Support bracket 172 is mounted to the top surface of longitudinal support plate 142. Adjusting screw 174 extends through support bracket 172 and interfaces with a load cell 176 mounted on the top surface of load arm 152B. Adjusting screw 174 can be adjusted manually, or by activating servo motor 178 through linking chain 180, to make fine adjustments to the force being exerted by anvil roll 16 on horn 20, thus to provide fine adjustment of the load being exerted on horn 20 by especially raised portion 70 of the anvil roll.

The present invention addresses the problem of consistency of the load or force/pressure being exerted on the web by the horn and the anvil at nip 22 when the raised portion of the anvil is in nip 22. First, support surfaces 54, 56A, 56B are provided for fixing the position of the horn with respect to frame 12 during the bonding operation, and wherein any cantilever elements of the force vectors are canceled by opposing force vectors, whereby cantilever vectors have little or no effect on positioning of horn 20. Second, the collective rigidity, stiffness, of bonding apparatus 10 is increased in order to reduce the amount of interference, between horn 20 and anvil roll 16, which is required in order to achieve the needed nip load to ultrasonically generate bonds having satisfactory bond strength.

The Web

The compositions of substrate webs 24 and/or 34 can be any materials known to those skilled in the art which are compatible with development of ultrasonic bonds. For example, substrate webs 24, 34 can include one or more nonwoven materials such as spunbond, melt blown, spun laced or carded polymeric materials, a film material such as a polyolefin, for example polyethylenes and/or polypropylenes, or a polyurethane film, a foam material, or combinations of the above recited materials.

For purposes of the present description, "nonwoven web" means a fibrous web of material which is formed of fibers without aid of a textile weaving or knitting process. Substrate webs 24, 34 may be elastic or non-elastic such as films or layers of natural rubber, synthetic rubber or thermoplastic elastomeric polymers.

Typical webs bonded using the invention have thicknesses of about 0.0005 inch to about 0.25 inch at bonding loci, and may have greater or lesser thicknesses at loci of the web which are not being so bonded.

As used herein, the terms "elastomeric" or "elastic" refer to any material which can be elongated or stretched in a specified direction from about 20 percent to at least about 400 percent by application of a biasing force and which recovers to within about 35 percent of its original length after being subsequently released from the biasing force after a short-term duration of the stretched condition.

Substrate webs 24, 34 can be made from a common material or can be made from different materials. In some embodiments, at least one of the substrate webs is made from resiliently stretchable material such as stretch-bonded-laminate (SBL) material, neck-bonded laminate (NBL) material, elastomeric film, elastomeric foam, or like resiliently stretchable materials as are well known to those skilled in the art.

The bonding resulting from application of ultrasonic energy can result from partial or complete melting of materials in one or both of substrate webs 24 or 34, or partial or complete melting of material in a corresponding element being applied to a respective substrate web. Bonding can result from partial or complete melting of material of only one of the elements being acted upon, with the activated material interacting with the corresponding adjacent substrate web or element which in turn results in mechanical interlocking of the elements/webs to each other.

In the alternative, bonding can result in mutual partial or complete melting of materials of both of the elements being acted upon, with flow and/or other interaction between or among the respective materials of both elements which results in a bonding better represented as adhesive bonding or cohesive bonding, optionally in combination with the above-recited mechanical interlocking of components of one or both of the respective elements to each other.

Figure 5:
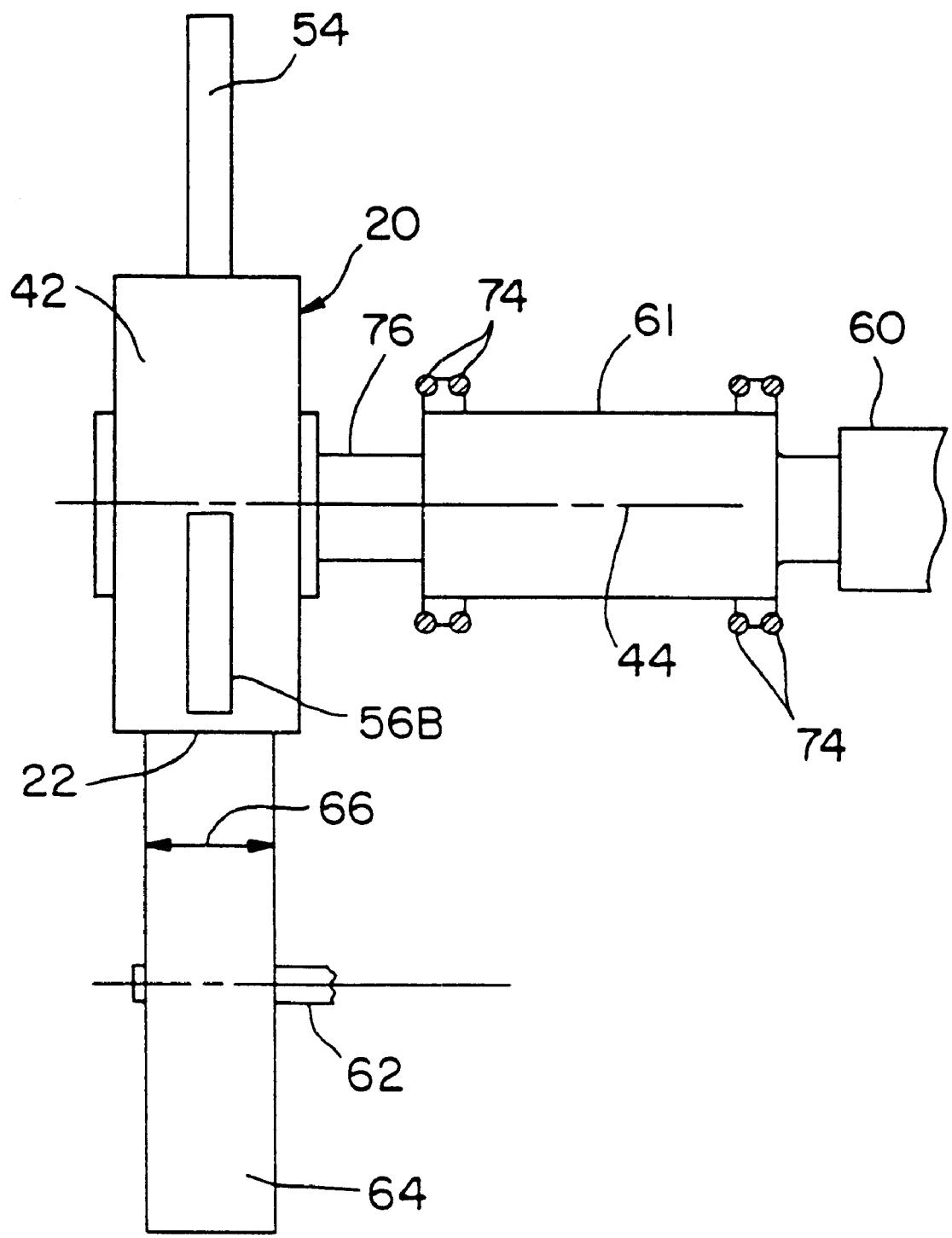
FIG. 5 shows a representative side elevation view of the apparatus illustrated in FIG. 4.

In some embodiments of the invention, portions of continuously moving substrate webs 24, 34 are both softened and/or melted using ultrasonic energy supplied to the rotary ultrasonic horn, along with sufficient pressure to activate the materials in the respective substrate webs, whereby the webs are thus bonded to each other through simultaneous application of ultrasonic energy and pressure. In such a configuration, anvil roll 16 is configured to rotate about anvil axis 50 and to press substrate webs 24, 34 against the outer peripheral bonding surface of ultrasonic horn 20 e.g. at raised portion 70 thereby bonding the substrate webs to each other. As illustrated in FIGS. 2, 4, and 5, support rolls 56A, 56B are configured to contact outer bonding surface 42 of horn 20 to hold horn 20 in a substantially fixed location while the support rolls are engagingly supporting horn 20.

The Process

When ultrasonic vibration of a rotary ultrasonic horn is commenced, the energy passing through the horn causes the temperature of the horn to rise. As the temperature of the horn rises, the size, including the diameter, of the horn changes. As the diameter of the horn changes, the inferred interference changes, as does the corresponding nip pressure, and the resonant frequency. As the nip pressure changes, bond quality changes. In order to avoid the above changes of processing parameters. it is common to leave the horn energized, though not rotating, even when the horn is not being used, so that the operator need not deal with size changes as a process variable.

With the horn energized but not rotating, any substantial object disposed against outer working surface 42 of the stationary horn can cause development of a flat spot on the horn surface at the locus of touching. Accordingly, it is important that all support of horn 20 at surface 42 be withdrawn when the horn is not rotating. Such withdrawal of horn support has both operational and structural implications. Operationally, the programmable logic computer (not shown) which controls operation of the system, is programmed to automatically withdraw support rolls 56A, 56B from surface 42 any time rotation of horn 20 is stopped. Structurally, horn 20 is intentionally positioned below back-up roll 54 such that, when rolls 56A, 56B are withdrawn, the weight of horn 20 causes the horn to sag away from back-up roll 54, along with corresponding compression of O-rings 74. For an exemplary horn approximately 6 inches diameter, three inches thick, the horn typically sags about 0.010 inch to about 0.025 inch away from back-up roll 54.

Withdrawing support rolls 56A, 56B causes ultrasonic horn 20 to sag and come out of contact with back-up roll 54 e.g. at the end of a bonding project, and re-engaging support rolls 56A, 56B, lifting ultrasonic horn 20 into contact with the back-up roll at initiation of a subsequent project, and thereby returning the ultrasonic horn to the same defined location. The disengagement of support rolls 56A, 56B and subsequent resultant sagging of ultrasonic horn 20 away from back-up roll 54 allows the horn to continue vibrating with other portions of the machine stopped. The continued vibration of the horn keeps the diameter of the ultrasonic horn constant, since ultrasonic horns tend to demonstrate thermal expansion during operation.

Referring now to FIG. 8, the actual touching contact is illustrated in solid outline while the dashed outline of anvil roll 16 illustrates the position that would be occupied by anvil roll 16 in the absence of the interference with horn 20. Thus the dashed outline illustrates the amount of interference inferred by the settings of e.g. adjusting knob 126 and/or adjusting screw 174.

As used herein, "interference" is measured by first fixing the horn in its bonding position, with support rolls 56A, 56B supporting horn 20 against back-up roll 54, with the sag removed from the horn. Preferably adjusting screw 124 and/or adjusting screw 174 are calibrated such that each revolution of the respective screw represents a known distance of advance of the respective horn or anvil roll. Such advance must, of course, take into account the lever arm between the respective screw, the point of pivotation, and the point of application of force by back-up roll 54. Thus, where the screw represents a second class lever applying force between the screw and the pivot point as in the illustrated embodiments, the distance traveled by the screw end of the lever arm will be greater than the distance traveled by the back-up roll 54. Respectively, the distances recited herein for advance of the back-up roll are distances effective at the back-up roll, though such distances may be determined based on measurements or calibrations determined at the adjusting screw.

In the illustrated embodiments wherein force is applied on the back-up roll through a second class lever, the lever arm is an element in the stiffness analysis. In embodiments wherein the force on the back-up roll is applied to cradle arm 112 in line with the axes of the back-up roll and the horn, there is no lever arm requiring bending stiffness analysis. In either analysis, bladder 138 provides relief for any overstressing condition at the nip, since the forces in excess of that being exerted by the bladder cause the bladder to move downwardly, thus widening the actual physical gap at the nip.

In conventional processes at least 0.009 inch of interference, typically greater than 0.010 inch, is required to achieve satisfactory force in the nip to obtain bonding with ultrasonic energy. Use of less interference in a conventional environment does not provide sufficient force in the nip to develop sufficiently high strength ultrasonic bonds. However, as noted earlier, the levels of interference conventionally used for continuous bonds, when used in an intermittent bonding process, are accompanied by the recited bounce, and the related inconsistency of bonding developed as a result.

In order for the horn and anvil to exert sufficient pressure at bonding nip 22, the horn and/or anvil must move toward each other to close and pressurize the nip. Description of the process starts with the horn and anvil spaced from each other, with the horn in dead load free sag with no support being applied directly to surface 42. 300 pounds of force is being exerted by bladder 138 against load cell 176. Back-up roll 54 is brought to a distance from the horn surface which represents the sag distance. Where, for example, the sag distance is 0.015 inch, roll is positioned 0.015 inch above the top of horn 20. Then support rolls 56A, 56B are brought into supporting contact with the sides of horn 20, and rolls 56A, 56B are further driven to lift the horn into contact with back-up roll 54. With support rolls 56A, 56B holding the horn against back-up roll 54, the horn is then held fixed by rolls 54, 56A, 56B collectively in its operating position. All that remains is to apply the interference pressure required to activate bonding responses to the ultrasonic energy passing through horn 20. To that end, adjusting screw 174 of the anvil support apparatus is turned the desired amount to apply the amount of "interference" force required to activate a bonding response in the web and/or other work pieces being bonded. Typically, a force of about 400 pounds per inch width of the nip is sufficient to produce an acceptable ultrasonic bond in nip 22 while preserving the integrity of a typical non-woven web used in fabricating absorbent articles such as diapers.

If back-up roll 54 is adjusted to account for a respective amount of horn sag, for example 0.015 inch, above a portion of the unloaded horn surface 42 closest to back-up roll 54, substantially all the force distributed to O-rings 74 closest to the horn face due to the weight of the horn is removed when the horn is lifted. Similarly, as first and second support rolls (56A, 56B) are urged inwardly against outer surface 42 of ultrasonic horn 20 thus lifting the horn upwardly against back-up roll 54, if the back-up roll is set to account for the respective amount of horn sag, as stated above, the lifting of the horn by support rolls 56A, 56B takes the load off O-rings 74 disposed closest to the horn face.

The inventors herein have discovered that, given the structural set-up of the invention, the required amount of "interference" is controlled by the overall stiffness of the bonding assembly 10. The inventors have further discovered that, since the amount of bounce is related to the amount of interference, then the amount of bounce can be reduced by decreasing the amount of interference. But in order to decrease the amount of interference and maintain the required amount of bonding force, the stiffness of the overall structure must be increased. Accordingly, the invention stiffens the structure of bonding apparatus 10 such that the level of interference is reduced while continuing to develop the required level of bonding force.

Given the direct relationship between interference and the level of bounce, as well as the inconsistency in bonding, any reduction in the conventionally-known minimal interference of 0.009 inch, is an improvement over known art, and results in improved bond quality. Thus, the level of interference contemplated in this invention can be as great as 0.008 inch, but is preferably further reduced to no more than about 0.006 inch, more preferably no more than 0.004 inch. Interferences as low as 0.000 inch have been found to be satisfactory, with about 0.003 inch to about 0.004 inch being a most preferred level of interference.

Reduction of interference provides a number of advantages to the bonding process. First, reducing interference reduces the level of impact loading on structural members of the system. Second, as discussed above, reducing interference reduces the amount of bouncing at initiation of entry of raised portion 70 into the nip. Third, reducing the amount of bounce reduces mechanical feedback through the ultrasonic system and thereby reduces the incidence of electrical voltage spikes being generated by such mechanical feedback and fed into the sensitive electronics which control the ultrasonic system. This reduction in the incidence of electrical voltage spikes results in a reduction of the incidence of generator overloads and shutdowns.

In the above scenario, the provision of back-up roll 54 eliminates or at least attenuates overhung load on shaft 76, whereby developing bonding force in the nip relies more on the stiffness and rigidity of horn support apparatus 18 than on the stiffness of shaft 76 and O-ring supports. The pressure in bladder 138 provides the desired force to hold load transmission assembly 136 against adjusting screw 174.

As indicated above, the force developed in nip 22 passes through a variety of elements to get back to frame 12. Accordingly, the critical structural consideration is the overall stiffness of the framed structure 10. Such stiffness can be achieved in various ways with various specifications for the respective elements of the structure. The important parameter is that the required interference level achieves a suitable force at nip 22 to develop ultrasonic bonds in the work piece.

For example, strengthening, stiffening only the frame members (e.g. 26, 28, 30, 32) while not addressing members of anvil support apparatus 14 or horn support apparatus 18 can leave excess deflection in support apparatus 14 and/or 18. Correspondingly, stiffening support apparatus 14, 18 while not addressing the frame members can similarly leave excess deflection in the frame. Thus, whatever the starting structure not of this invention, the objective of achieving suitable stiffness is measured as the resulting amount of interference required to achieve good quality ultrasonic bonds. By thus expressing the invention in terms of the resulting interference, one can achieve the invention while being free to choose and design various elements, subassemblies, and assemblies while also freely selecting desired materials of construction, suitable to the user's specific application.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. Ultrasonic bonding apparatus for intermittently creating ultrasonic bonds in sequentially advancing work piece segments, in a nip, wherein the work piece segments to be bonded are up to about 0.25 inch thick, said ultrasonic bonding apparatus comprising:
   (a) a frame;
   (b) anvil support apparatus defining an anvil loading assembly connected to said frame, and supporting an anvil roll mounted for rotation about a first generally horizontal axis, said anvil roll comprising a first relatively smaller radius portion extending about a first portion of a circumference of said anvil roll, and at least one raised bonding portion having a second relatively larger radius extending about a second portion of the circumference of said anvil roll; and
   (c) horn support apparatus connected to said frame, and supporting a rotary ultrasonic horn mounted for rotation about a second generally horizontal axis, aligned with the first generally horizontal axis, said ultrasonic horn and said anvil roll collectively being mounted and configured such that said ultrasonic horn and said anvil roll can be brought together to define a nip therebetween, and wherein said anvil roll and said ultrasonic horn can rotate in common with movement of work piece elements through the nip, and intermittent passage of said raised bonding portion through the nip, said frame, said anvil support apparatus, and said horn support apparatus collectively being sufficiently rigid that said horn and said anvil roll can be brought together with interference levels of from about 0.000 inch to about 0.008 inch at the raised bonding portion in combination with defining sufficient nip pressure to develop ultrasonic bonds in the work piece segments passing through the nip.

2. Ultrasonic bonding apparatus as in claim 1, a width being defined between the ultrasonic horn and the anvil roll, said anvil support apparatus including a resilient support member defining a resistance, to withdrawal of the anvil roll from the nip, of about 400 pounds per inch width of the nip.

3. Ultrasonic bonding apparatus as in claim 1, said anvil support apparatus further comprising a lifting plate for lifting and lowering said anvil loading assembly with respect to said ultrasonic horn.

4. Ultrasonic bonding apparatus as in claim 1, said anvil support apparatus further comprising a pivot plate pivoting the anvil loading assembly about a third axis oriented perpendicular to the first axis.

5. Ultrasonic bonding apparatus as in claim 1, including a stop defining a limit to downward travel of said anvil loading assembly.

6. Ultrasonic bonding apparatus as in claim 1, including a back-up roll mounted above said ultrasonic horn, and wherein said back-up roll engages an outer surface of said ultrasonic horn in alignment with the first and second axes.

7. Ultrasonic bonding apparatus as in claim 6, including an adjusting screw, operating on a cradle arm, for adjusting a height of said back-up roll, and thus generally defining an upper limit to movement of said ultrasonic horn.

8. Ultrasonic bonding apparatus as in claim 1, including first and second support rolls releasably supporting opposing sides of an outer surface of said ultrasonic horn.

9. Ultrasonic bonding apparatus as in claim 8 wherein axes of said first and second support rolls are positioned lower than the axis of the ultrasonic horn, whereby urging said first and second support rolls inwardly against the outer surface of said ultrasonic horn lifts said ultrasonic horn upwardly against said back-up roll.

10. Ultrasonic bonding apparatus as in claim 8, said first and second support rolls being mounted to a horn support plate through an activation assembly, said horn support apparatus further comprising equalizer arms mounted to said horn support plate, and equalizing inward and outward movement of the first and second support rolls.

11. Ultrasonic bonding apparatus as in claim 1 wherein the second radius is about 0.01 inch to about 0.25 inch greater than the first radius.

12. A method of intermittently creating ultrasonic bonds in sequentially advancing work piece segments, wherein the work piece segments to be bonded are up to about 0.25 inch thick, the method comprising:
   (a) passing the work piece segments through a nip defined by a frame, anvil support apparatus defining an anvil loading assembly connected to the frame and supporting an anvil roll mounted for rotation about a first generally horizontal axis, the anvil roll comprising a first relatively smaller radius portion extending about a first portion of a circumference of the anvil roll and at least one raised bonding portion having a second relatively larger radius extending about a second portion of the circumference of the anvil roll, and horn support apparatus connected to the frame, and supporting a rotary ultrasonic horn mounted for rotation about a second generally horizontal axis, aligned with the first generally horizontal axis;

(b) bringing the ultrasonic horn and the anvil roll together in defining the nip with interference of about 0.000 inch to about 0.008 inch at the raised bonding portion, and correspondingly developing suitable pressure in the nip to create ultrasonic bonds;

(c) activating ultrasonic energy in the ultrasonic bonding horn; and (d) rotating the ultrasonic horn and anvil roll in common with movement of the work piece segments through the nip, and thereby intermittently applying pressure to the work piece segments at the raised bonding portion, and creating ultrasonic bonds in the work piece segments passing through the nip.

13. A method as in claim 12, including applying first and second support rolls to sides of the ultrasonic horn and lifting the ultrasonic horn into engagement with a back-up roll aligned with the first and second axes such that the first and second support rolls, in combination with the back-up roll, define a fixed location of the ultrasonic horn.

14. A method as in claim 13, including applying the first and second support rolls to the sides of the ultrasonic horn at locations lower than the second axis, and urging the first and second support rolls against the ultrasonic horn and thereby lifting the ultrasonic horn into engaging relationship with the back-up roll.

15. A method as in claim 13, including prior to lifting the ultrasonic horn into engagement with the back-up roll, moving the back-up roll to the sag distance of the ultrasonic horn such that upon the horn being lifted into engagement with the back-up roll, substantially all sag is removed from the ultrasonic horn.

16. A method as in claim 14, including prior to lifting the ultrasonic horn into engagement with the back-up roll, moving the back-up roll to the sag distance of the ultrasonic horn such that upon the horn being lifted into engagement with the back-up roll, substantially all sag is removed from the ultrasonic horn.

17. A method as in claim 12 wherein the bringing of the anvil roll and the ultrasonic horn together primarily comprises lifting the anvil roll, thereby to bring the anvil roll into engaging relationship with an outer surface of said ultrasonic horn.

18. A method as in claim 12, including pivoting the anvil roll about an axis perpendicular to the first axis thereby to bring the first axis into alignment with the second axis.

19. A method as in claim 12, including limiting downward movement of the anvil loading assembly and thereby preventing disengagement of drive gears which transmit drive power between the anvil support apparatus and the horn support apparatus.

20. A method as in claim 13, including adjusting height of the back-up roll and thereby controlling height of the ultrasonic horn.

21. A method as in claim 13, including releasing the support rolls and the backup roll from engagement with the ultrasonic horn, and re-engaging the support rolls and back-up roll with the ultrasonic horn, and thereby returning the ultrasonic horn to the defined location.

22. A method as in claim 14, including releasing the support rolls and back-up roll from engagement with the ultrasonic horn, and re-engaging the support rolls and back-up roll with the ultrasonic horn, and thereby returning the ultrasonic horn to the defined location.

23. A method of intermittently creating ultrasonic bonds in sequentially advancing work piece segments, wherein the work piece segments to be bonded are up to about 0.25 inch thick, the method comprising:

(a) passing the work piece segments through a nip defined by a frame, anvil support apparatus defining an anvil loading assembly connected to the frame and supporting an anvil roll mounted for rotation about a first generally horizontal axis, the anvil roll comprising a first relatively smaller radius portion extending about a first portion of a circumference of the anvil roll and at least one raised bonding portion having a second relatively larger radius extending about a second portion of the circumference of the anvil roll, and horn support apparatus connected to the frame, and supporting a rotary ultrasonic horn mounted for rotation about a second generally horizontal axis, aligned with the first generally horizontal axis;

(b) bringing the horn, mounted below a back-up roll, into engagement with the back-up roll;

(c) bringing the anvil roll into contact with the ultrasonic horn thereby defining the nip, and correspondingly developing suitable pressure in the nip to create ultrasonic bonds;

(d) activating ultrasonic energy in the ultrasonic bonding horn; and (e) rotating the ultrasonic horn and anvil roll in common with movement of the work piece segments through the nip, and thereby intermittently applying pressure to the work piece segments at the raised bonding portion, and creating ultrasonic bonds in the work piece segments passing through the nip.

24. A method as in claim 23, including applying first and second support rolls to sides of the ultrasonic horn and lifting the ultrasonic horn into engagement with the back-up roll such that the back-up roll is aligned with the first and second axes such that the first and second support rolls, in combination with the back-up roll, define a fixed location of the ultrasonic horn.

25. A method as in claim 24, including applying the first and second support rolls to the sides of the ultrasonic horn at locations lower than the second axis, and urging the first and second support rolls against the ultrasonic horn and thereby lifting the ultrasonic horn into engaging relationship with the back-up roll.

26. A method as in claim 25, including prior to lifting the ultrasonic horn into engagement with the back-up roll, moving the back-up roll to the sag distance of the ultrasonic horn such that upon the horn being lifted into engagement with the back-up roll, substantially all sag is removed from the ultrasonic horn.

27. A method as in claim 23 wherein the bringing of the anvil roll and ultrasonic horn together primarily comprises lifting the anvil roll, thereby to bring the anvil roll into engaging relationship with an outer surface of the ultrasonic horn.

28. A method as in claim 23, including pivoting the anvil roll about an axis perpendicular to the first axis thereby to bring the first axis into alignment with the second axis.

29. A method as in claim 23, including limiting downward movement of the anvil loading assembly and thereby preventing disengagement of drive gears which transmit drive power between the anvil support apparatus and the horn support apparatus.

30. A method as in claim 23, including adjusting height of the back-up roll and thereby controlling height of the ultrasonic horn.

31. A method as in claim 24, including releasing the support rolls and the back-up roll from engagement with the ultrasonic horn, and re-engaging the support rolls and back-up roll with the ultrasonic horn, and thereby returning the ultrasonic horn to the defined location.

32. A method as in claim 25, including releasing the support rolls and back-up roll from engagement with the ultrasonic horn, and re-engaging the support rolls and back-up roll with the ultrasonic horn, and thereby returning the ultrasonic horn to the defined location.

33. Ultrasonic bonding apparatus for intermittently creating ultrasonic bonds in sequentially advancing work piece segments, in a nip, wherein the work piece segments to be bonded are up to about 0.25 inch thick, said ultrasonic bonding apparatus comprising:
   (a) a frame;
   (b) anvil support apparatus defining an anvil loading assembly connected to said frame, and supporting an anvil roll mounted for rotation about a first generally horizontal axis, said anvil roll comprising a first relatively smaller radius portion extending about a first portion of a circumference of said anvil roll, and at least one raised bonding portion having a second relatively larger radius extending about a second portion of the circumference of said anvil roll; and
   (c) horn support apparatus connected to said frame, and supporting a rotary ultrasonic horn mounted for rotation about a second generally horizontal axis, aligned with the first generally horizontal axis,
said ultrasonic horn and said anvil roll collectively being mounted and configured such that said ultrasonic horn and said anvil roll can be brought together to define a nip therebetween, and wherein said anvil roll and said ultrasonic horn can rotate in common with movement of work piece elements through the nip, and intermittent passage of said raised bonding portion through the nip,
said horn support apparatus being adapted to fix the position of said horn with respect to said frame during bonding operation such that cantilever elements of force vectors are canceled by opposing force vectors, whereby cantilever vectors have little or no effect on positioning of said horn.

34. Ultrasonic bonding apparatus as in claim 33, including a back-up roll mounted above said ultrasonic horn, and wherein said back-up roll engages an outer surface of said ultrasonic horn in alignment with the first and second axes.

35. Ultrasonic bonding apparatus as in claim 34, including-an adjusting screw, operating on a cradle arm, for adjusting a height of said back-up roll, and thus generally defining an upper limit to movement of said ultrasonic horn.

36. Ultrasonic bonding apparatus as in claim 33, including first and second support rolls releasably supporting opposing sides of an outer surface of said ultrasonic horn.

37. Ultrasonic bonding apparatus as in claim 36 wherein axes of said first and second support rolls are positioned lower than the axis of the ultrasonic horn, whereby urging said first and second support rolls inwardly against the outer surface of said ultrasonic horn lifts said ultrasonic horn upwardly against said back-up roll.

38. Ultrasonic bonding apparatus as in claim 36, said first and second support rolls being mounted to a horn support plate through an activation assembly, said horn support apparatus further comprising equalizer arms mounted to said horn support plate, and equalizing inward and outward movement of the first and second support rolls.

39. A method of intermittently creating ultrasonic bonds in sequentially advancing work piece segments, wherein the work piece segments to be bonded are up to about 0.25 inch thick, the method comprising:
   (a) passing the work piece segments through a nip defined by
      (i) a frame,
      (ii) anvil support apparatus defining an anvil loading assembly connected to the frame and supporting an anvil roll mounted for rotation about a first generally horizontal axis, the anvil roll comprising a first relatively smaller radius portion extending about a first portion of a circumference of the anvil roll and at least one raised bonding portion having a second relatively larger radius extending about a second portion of the circumference of the anvil roll, and
      (iii) horn support apparatus connected to the frame, and supporting a rotary ultrasonic horn mounted for rotation about a second generally horizontal axis, aligned with the first generally horizontal axis;
   (b) bringing the anvil roll into contact with the ultrasonic horn, and fixing the position of the horn with respect to the frame such that cantilever elements of force are canceled by opposing force vectors, whereby cantilever vectors have little or no effect on positioning of the horn, the bringing of the anvil roll into contact with the ultrasonic horn and the fixing of the position of the horn defining the nip and developing suitable pressure in the nip to create ultrasonic bonds;
   (c) activating ultrasonic energy in the ultrasonic bonding horn; and
   (d) rotating the ultrasonic horn and anvil roll in common with movement of the work piece segments through the nip, and thereby intermittently applying pressure to the work piece segments at the raised bonding portion, and creating ultrasonic bonds in the work piece segments passing through the nip.

40. A method as in claim 39, including applying first and second support rolls to sides of the ultrasonic horn and lifting the ultrasonic horn into engagement with the back-up roll such that the back-up roll is aligned with the first and second axes such that the first and second support rolls, in combination with the back-up roll, define a fixed location of the ultrasonic horn.

41. A method as in claim 40, including applying the first and second support rolls to the sides of the ultrasonic horn at locations lower than the second axis, and urging the first and second support rolls against the ultrasonic horn and thereby lifting the ultrasonic horn into engaging relationship with the back-up roll.

42. A method as in claim 41, including prior to lifting the ultrasonic horn into engagement with the back-up roll, moving the-back-up roll to the sag distance of the ultrasonic horn such that upon the horn being lifted into engagement with the back-up roll, substantially all sag is removed from the ultrasonic horn.

43. A method as in claim 39 wherein the bringing of the anvil roll and ultrasonic horn together primarily comprises lifting the anvil roll, thereby to bring the anvil roll into engaging relationship with an outer surface of the ultrasonic horn.

44. A method as in claim 39, including pivoting the anvil roll about an axis perpendicular to the first axis thereby to bring the first axis into alignment with the second axis.

45. A method as in claim 39, including adjusting height of the back-up roll and thereby controlling height of the ultrasonic horn.

46. A method as in claim 41, including releasing the support rolls and back-up roll from engagement with the ultrasonic horn, and re-engaging the support back-up roll with the ultrasonic horn, and thereby returning the ultrasonic horn to the defined location.

47. A method of creating ultrasonic bonds in sequentially advancing absorbent article substrate work piece segments, wherein the work piece segments to be bonded are up to about 0.25 inch thick, the method comprising:
   (a) passing the work piece segments through a nip defined by an anvil roll mounted for rotation about a first axis, the anvil roll comprising a width and a circumference, said anvil roll further comprising a first relatively smaller radius portion extending about a first portion of a circumference of the anvil roll and at least one raised bonding element having a second relatively larger radius extending about a second portion of the circumference of the anvil roll, and a rotary ultrasonic horn mounted for rotation about a second axis, aligned with the first axis;
   (b) bringing an ultrasonic horn and the anvil roll together in defining the nip with interference of about 0.000 inch to about 0.008 inch at the raised bonding element, and correspondingly developing suitable pressure in the nip to create ultrasonic bonds;
   (c) activating ultrasonic energy in the ultrasonic bonding horn; and
   (d) rotating the ultrasonic horn and anvil roll in common with movement of the work piece segments through the nip, and thereby intermittently applying pressure to the work piece segments at the raised bonding element, and creating ultrasonic bonds in the work piece segments passing through the nip.

48. A method as in claim 47 wherein said raised bonding element further comprises an operating surface represented by an area defined by the width of said raised bonding element and the second portion of the circumference of said anvil roll.

49. A method as in claim 48 wherein said anvil roll comprises a transition gradient between said first portion of the circumference of said anvil roll and said raised bonding element, product of said transition gradient and width of said raised bonding element defining a loading surface of said transition gradient.

50. A method as in claim 49 wherein said operating surface of said raised bonding element of said anvil roll comprises an array of bonding projections thereon extending around said respective second portion of the circumference of said anvil roll, and across the entirety of the transverse width of said raised bonding element, thereby covering substantially the entirety of said operating surface of said raised bonding element of said anvil roll.

51. A method as in claim 49 wherein said operating surface of said raised bonding element of said anvil roll comprises an array of bonding projections thereon, said projections being disposed in discrete spaced arrays which cover portions but not all of either or both of the circumference or width of said operating surface of said raised bonding element of said anvil roll.

52. A method as in claim 47 wherein said raised bonding element of said anvil roll, including a first larger radius portion of the anvil roll, provides bonding activity at thinner sections of a web of material, and said second relatively smaller radius portion of said anvil roll provides clearance between the anvil roll and said horn for passage of relatively thicker sections of said web between said anvil roll and said horn.

53. A method as in claim 47 wherein, when said raised bonding element of said anvil roll passes into and through said nip, the presence of said raised bonding element in combination with interference between said raised bonding element of said anvil roll, and said horn, imposes stress on both said horn and said anvil roll, thus providing suitable force at said nip to develop ultrasonic bonds using ultrasonic energy being expressed by said horn.

54. A method as in claim 47 wherein, when the raised bonding element of the anvil roll is not disposed in the nip, and the smaller radius portion of the anvil roll is disposed in the nip, the nip force is substantially less than the force required to form ultrasonic bonds.

* * * * *